US012593331B2

(12) United States Patent
Park et al.

(10) Patent No.: US 12,593,331 B2
(45) Date of Patent: Mar. 31, 2026

(54) METHOD AND DEVICE FOR RECEIVING SIDELINK RETRANSMISSION PACKET IN NR V2X

(71) Applicant: LG Electronics Inc., Seoul (KR)

(72) Inventors: Giwon Park, Seoul (KR); Seoyoung Back, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 17/920,994

(22) PCT Filed: May 14, 2021

(86) PCT No.: PCT/KR2021/006057
§ 371 (c)(1),
(2) Date: Oct. 24, 2022

(87) PCT Pub. No.: WO2021/230700
PCT Pub. Date: Nov. 18, 2021

(65) Prior Publication Data
US 2023/0164768 A1 May 25, 2023

(30) Foreign Application Priority Data

May 14, 2020 (KR) ........................ 10-2020-0057975

(51) Int. Cl.
*H04L 1/1822* (2023.01)
*H04L 1/1812* (2023.01)
(Continued)

(52) U.S. Cl.
CPC ....... *H04W 72/1263* (2013.01); *H04L 1/1812* (2013.01); *H04W 72/25* (2023.01); *H04W 72/566* (2023.01); *H04W 76/28* (2018.02)

(58) Field of Classification Search
CPC ............ H04W 72/1263; H04W 72/25; H04W 72/566; H04W 72/40; H04W 76/28;
(Continued)

(56) References Cited

U.S. PATENT DOCUMENTS 11,304,039 B2 * 4/2022 Basu Mallick ....... H04L 5/0055
11,456,826 B2 * 9/2022 Cao ........................... H04L 1/08
(Continued)

FOREIGN PATENT DOCUMENTS

CN 107995605 A 5/2018
CN 110943809 A 3/2020
(Continued)

OTHER PUBLICATIONS

LG Electronics Inc. (Rapporteur), "Summary of MAC open issues for NR sidelink," R2-2003757, 3GPP TSG-RAN WG2 #109-e, Online, Apr. 20-30, 2020, 33 pages.
(Continued)

*Primary Examiner* — Christopher M Crutchfield
*Assistant Examiner* — Syed Ahmed
(74) *Attorney, Agent, or Firm* — Fish & Richardson P.C.

(57) ABSTRACT

Provided, according to one embodiment of the present disclosure, is a method for a first device carrying out sidelink communication. The method comprises the steps of: starting a first timer associated with a PSFCH resource on the basis that sidelink HARQ feedback information is not transmitted to a second device through the PSFCH resource on the basis of a first priority associated with the sidelink HARQ feedback information; on the basis that the first timer has expired, starting a second timer associated with a sidelink HARQ retransmission packet for a PSSCH or SCI; and receiving the sidelink HARQ retransmission packet from the second device after the second timer starts.

15 Claims, 20 Drawing Sheets

(51) Int. Cl.

| | | |
|---|---|---|
| *H04W 72/1263* | (2023.01) |
| *H04W 72/25* | (2023.01) |
| *H04W 72/40* | (2023.01) |
| *H04W 72/566* | (2023.01) |
| *H04W 76/14* | (2018.01) |
| *H04W 76/28* | (2018.01) |

(58) Field of Classification Search
CPC .............. H04W 76/14; H04W 52/0216; H04L
1/1812; H04L 1/1822; H04L 1/1851;
H04L 1/1854; H04L 1/1896
USPC ......................................................... 370/329
See application file for complete search history.

(56) References Cited

U.S. PATENT DOCUMENTS

| | | | | |
|---|---|---|---|---|
| 11,678,361 | B2 * | 6/2023 | Lin ....................... | H04W 72/40 |
| | | | | 370/329 |
| 11,765,693 | B2 * | 9/2023 | He ......................... | H04W 4/46 |
| | | | | 370/329 |
| 12,133,183 | B2 * | 10/2024 | Yi ....................... | H04W 52/367 |
| 2020/0107236 | A1 | 4/2020 | Tseng et al. | |
| 2022/0201654 | A1 * | 6/2022 | Lee ....................... | H04L 1/1812 |
| 2023/0019726 | A1 * | 1/2023 | Kwon ................... | H04L 1/1822 |

FOREIGN PATENT DOCUMENTS

| | | |
|---|---|---|
| KR | 20200034924 | 4/2020 |
| KR | 20200050848 | 5/2020 |
| WO | WO2020013641 | 1/2020 |
| WO | WO 2020/037688 A1 | 2/2020 |

OTHER PUBLICATIONS

Office Action in Chinese Appln. No. 202180034624.3, mailed on Oct. 30, 2024, 8 pages.

Huawei & HiSilicon, "Discussion on remaining MAC open issues for 5G V2X with NR SL," R2-2003555, Presented at 3GPP TSG-RAN WG2 Meeting #109-bis electronic Apr. 20-30, 2020, 28 pages.

Apple, "On Remaining Details of Mode 1 Resource Allocation," 3GPP TSG RAN WG1 #100bis, R1-2002324, e-Meeting, Apr. 20-30, 2020, 8 pages.

Extended European Search Report in European Appln. No. 21803103. 7, mailed on Jul. 19, 2023, 9 pages.

LG Electronics Inc. (Rapporteur), "Remaining V2X Mac Issues," 3GPP TSG-RAN WG2 #109-e, R2-200xxxx, Online, Apr. 20-30, 2020, 13 pages.

* cited by examiner

FIG. 7
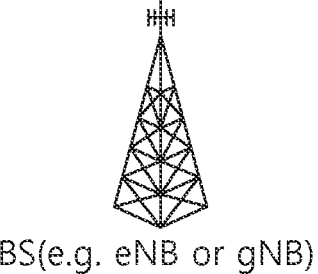
BS(e.g. eNB or gNB)
UE 1                                    UE 2

(a)                                        (b)

(a)          (b)          (c)

⬤ : TX UE
⊘ : RX UE end time of
a PSFCH resource (1120)

expiration time of
an SL DRX HARQ RTT timer
(or, a first timer) (1150)

1130 a PSFCH
resource
(1110)

operation time of
an SL DRX HARQ RTT timer
(or, a first timer) (1140)

FIG. 13

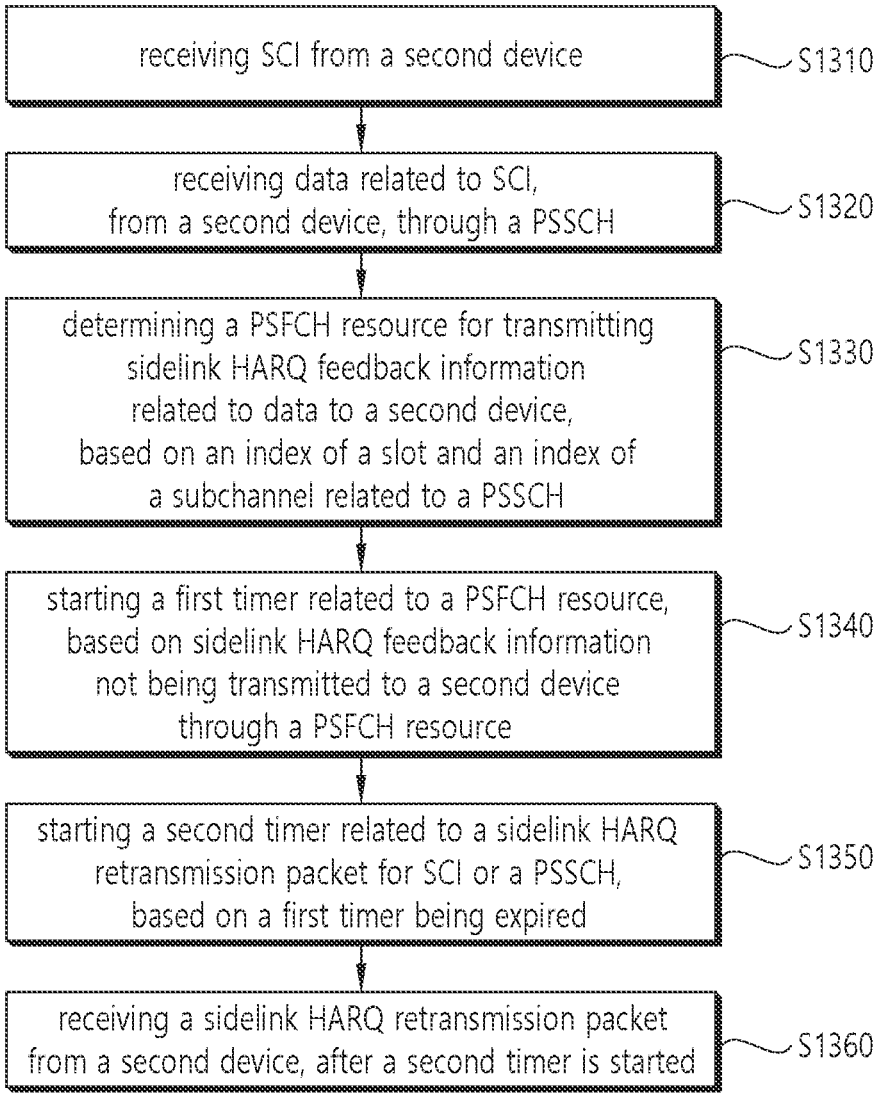

receiving SCI from a second device — S1310 receiving data related to SCI,
from a second device, through a PSSCH — S1320 determining a PSFCH resource for transmitting
sidelink HARQ feedback information
related to data to a second device,
based on an index of a slot and an index of
a subchannel related to a PSSCH — S1330 starting a first timer related to a PSFCH resource,
based on sidelink HARQ feedback information
not being transmitted to a second device
through a PSFCH resource — S1340 starting a second timer related to a sidelink HARQ
retransmission packet for SCI or a PSSCH,
based on a first timer being expired — S1350 receiving a sidelink HARQ retransmission packet
from a second device, after a second timer is started — S1360 transmitting SCI to a first device — S1410 transmitting data related to SCI through
a PSSCH to a first device — S1420 determining a PSFCH resource for receiving sidelink
HARQ feedback information,
based on an index of a slot and an index of
a subchannel related to a PSSCH — S1430

FIG. 18

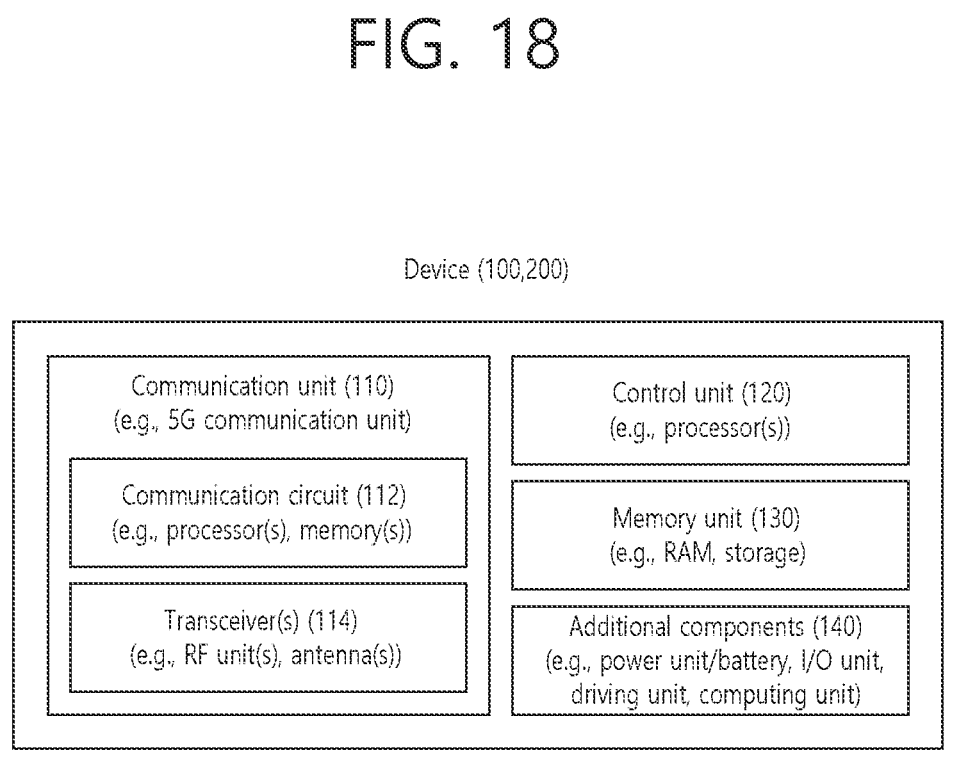

Device (100,200)

| Communication unit (110)<br>(e.g., 5G communication unit) | Control unit (120)<br>(e.g., processor(s)) |
|---|---|
| Communication circuit (112)<br>(e.g., processor(s), memory(s)) | Memory unit (130)<br>(e.g., RAM, storage) |
| Transceiver(s) (114)<br>(e.g., RF unit(s), antenna(s)) | Additional components (140)<br>(e.g., power unit/battery, I/O unit,<br>driving unit, computing unit) |

METHOD AND DEVICE FOR RECEIVING SIDELINK RETRANSMISSION PACKET IN NR V2X

CROSS-REFERENCE TO RELATED APPLICATIONS

This application is a National Stage application under 35 U.S.C. § 371 of International Application No. PCT/KR2021/006057, filed on May 14, 2021, which claims the benefit of Korean Patent Application No. 10-2020-0057975, filed on May 14, 2020. The disclosures of the prior applications are hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything, (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR), Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) for performing the same.

Another technical object of the present disclosure is to provide a method for receiving a sidelink retransmission packet in NR V2X and a device (or UE) for performing the same.

According to an embodiment of the present disclosure, a method for a first device to perform sidelink communication may be provided. The method may include: receiving sidelink control information (SCI) from a second device; receiving data related to the SCI, from the second device, through a physical sidelink shared channel (PSSCH); determining a physical sidelink feedback channel (PSFCH) resource for transmitting sidelink hybrid automatic repeat request (HARQ) feedback information related to the data to the second device, based on an index of a slot and an index of a subchannel related to the PSSCH; starting a first timer related to the PSFCH resource, based on the sidelink HARQ feedback information not being transmitted to the second device through the PSFCH resource; starting a second timer related to a sidelink HARQ retransmission packet for the SCI or the PSSCH, based on the first timer being expired; and receiving the sidelink HARQ retransmission packet from the second device, after the second timer is started, wherein the sidelink HARQ feedback information may be not transmitted to the second device through the PSFCH resource, based on a first priority related to the sidelink HARQ feedback information.

According to an embodiment of the present disclosure, a first device for performing sidelink communication may be proposed. The first device may comprise: one or more memories storing instructions; one or more transceivers; and one or more processors connected to the one or more memories and the one or more transceivers, wherein the one or more processors may execute the instructions to: receive sidelink control information (SCI) from a second device; receive data related to the SCI, from the second device, through a physical sidelink shared channel (PSSCH); determine a physical sidelink feedback channel (PSSCH) resource for transmitting sidelink hybrid automatic repeat request (HARQ) feedback information related to the data to the second device, based on an index of a slot and an index of a subchannel related to the PSSCH; start a first timer related to the PSFCH resource, based on the sidelink HARQ feedback information not being transmitted to the second device through the PSFCH resource; start a second timer related to a sidelink HARQ retransmission packet for the SCI or the PSSCH, based on the first timer being expired; and receive the sidelink HARQ retransmission packet from the second device, after the second tinier is started, wherein the sidelink HARQ feedback information may be not transmitted to the second device through the PSFCH resource, based on a first priority related to the sidelink HARQ feedback information.

A UE can efficiently perform SL communication.

In addition, it is possible to efficiently save power for sidelink communication in NR V2X.

BRIEF DESCRIPTION OF THE DRAWINGS

FIG. 3 shows a radio protocol architecture, in accordance with an embodiment of the present disclosure.

FIG. 5 shows a structure of a slot of an NR frame, in accordance with an embodiment of the present disclosure.

FIG. 7 shows a UE performing V2X or SL communication, in accordance with an embodiment of the present disclosure.

FIG. 13 is a flowchart showing a method for a first device to perform sidelink communication according to an embodiment of the present disclosure.

FIG. 18 shows another example of a wireless device, in accordance with an embodiment of the present disclosure.

DESCRIPTION OF EXEMPLARY EMBODIMENTS

Figure 1:
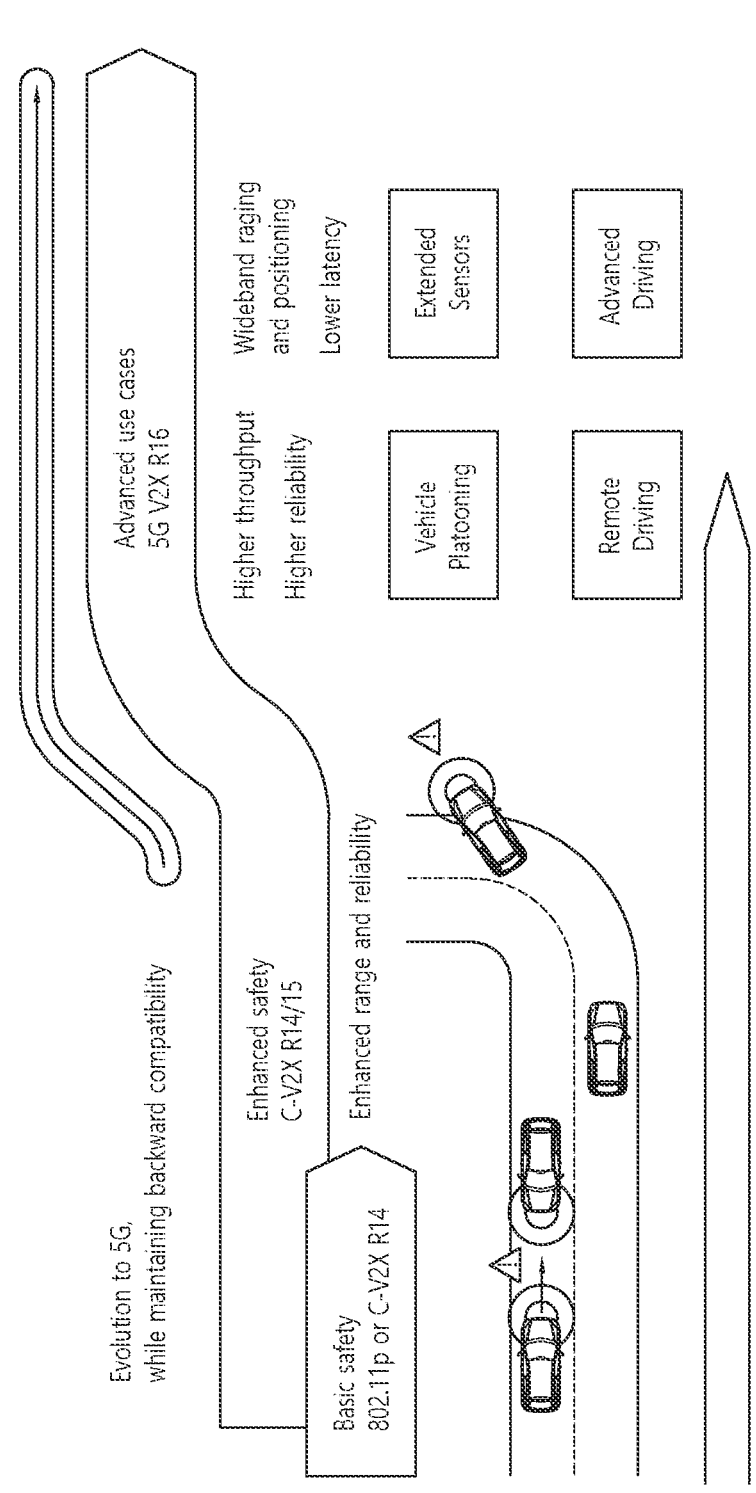
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B. C".

A slash (I) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", U may mean that "PDCCH" is proposed as an example of the "control information". In other words, the "control information" of the present specification is not limited to "PDCCH", and "PDDCH" may be proposed as an example of the "control information", in addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on, IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

Figure 2:
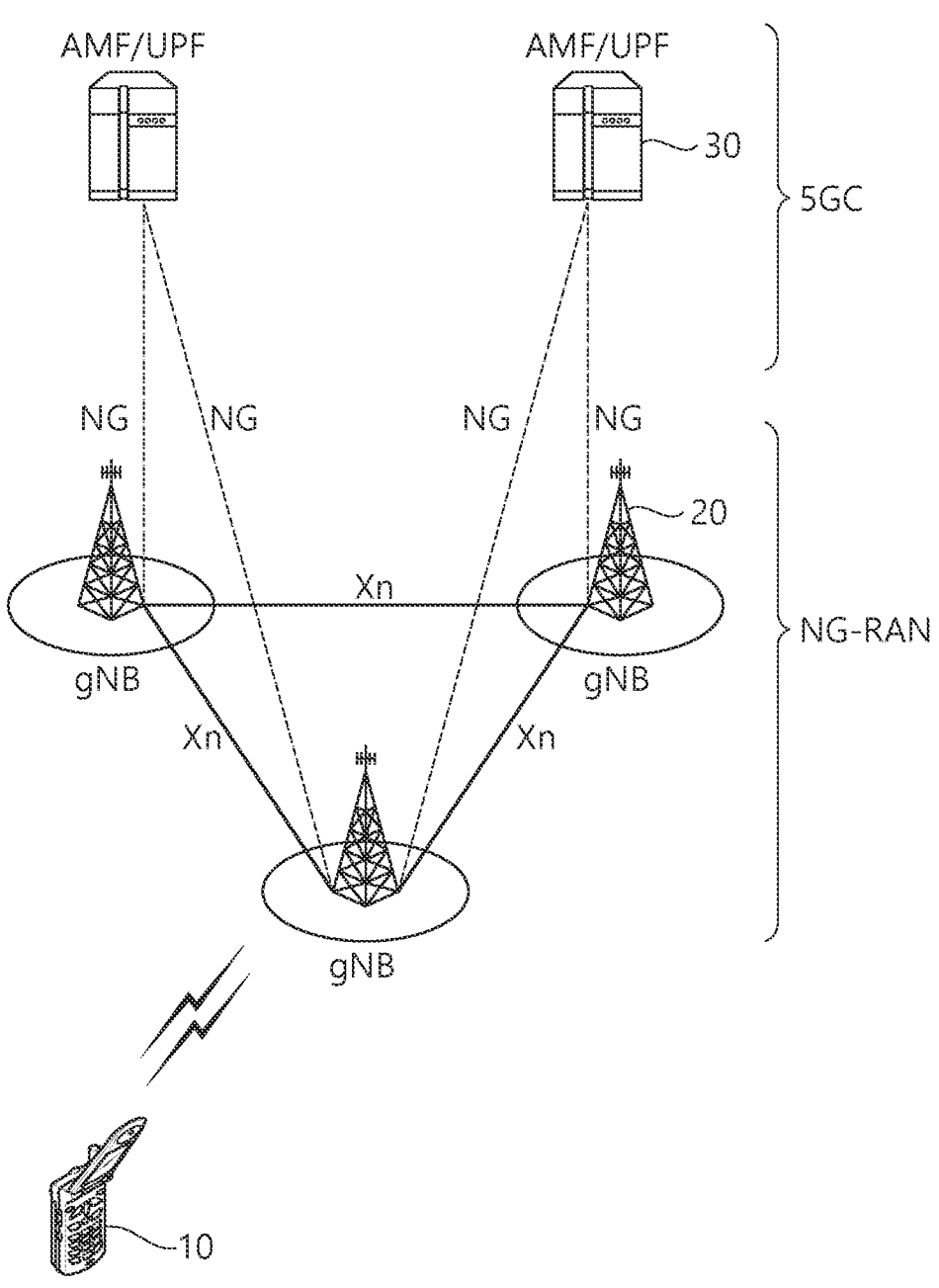
FIG. 2 shows a structure of an NR system, in accordance with an embodiment of the present disclosure.

For clarity in the description, the following description will mostly focus on LTE-A or 5G NR. However, technical features according to an embodiment of the present disclosure will not be limited only to this, FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
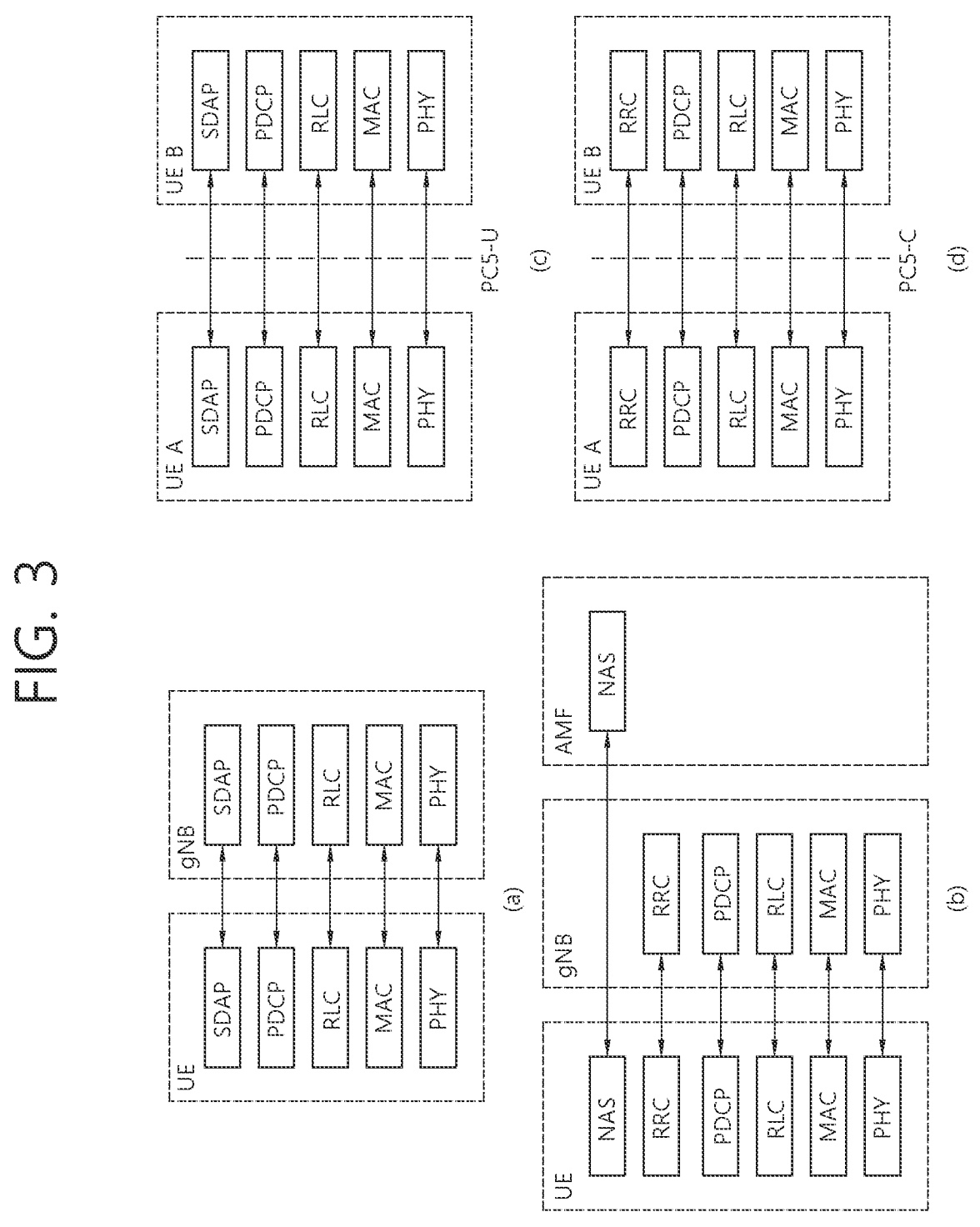

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (h) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio hearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PITY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RAH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
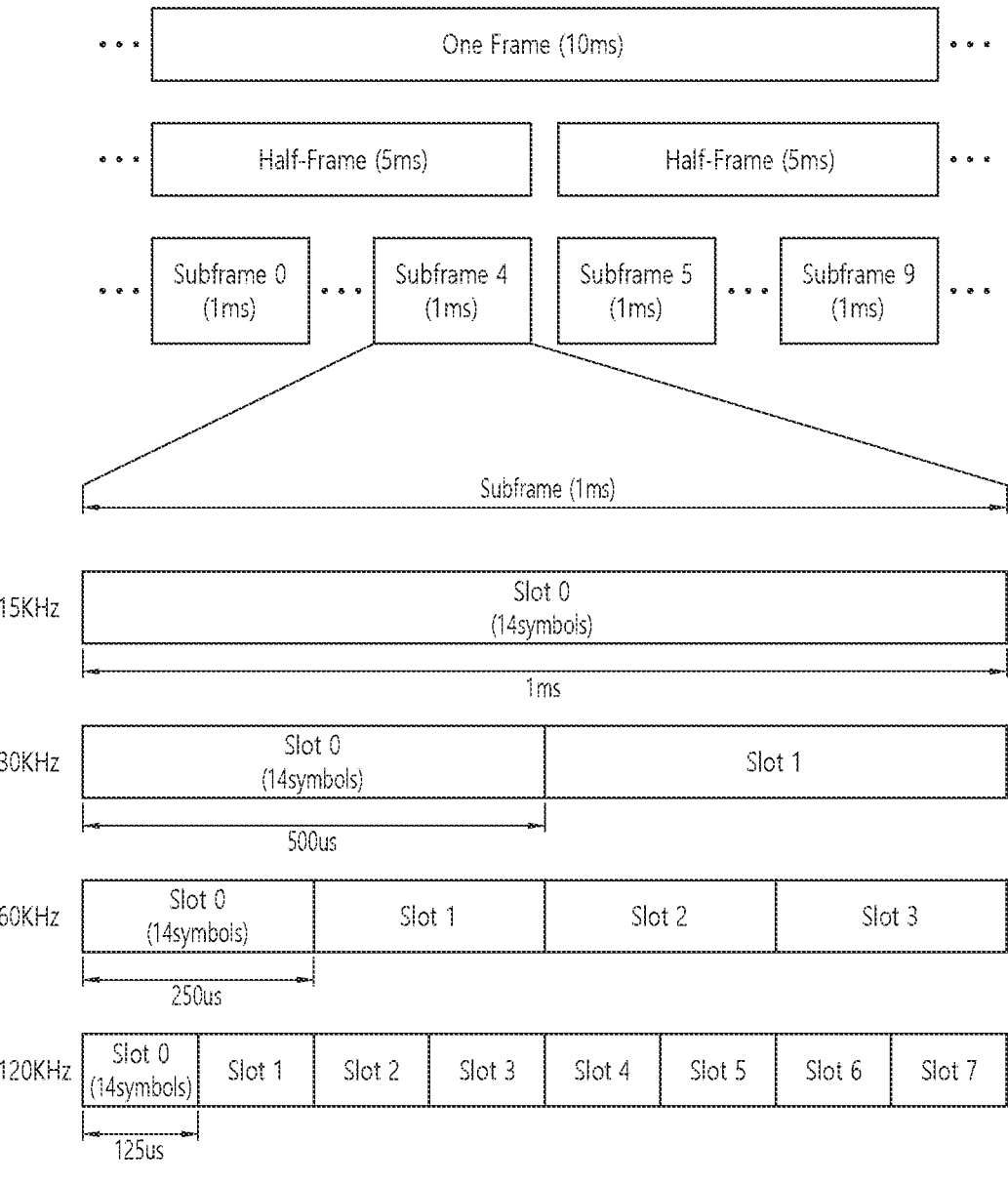
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-MMA (SC-FDMA) symbol (or Discrete Fourier Transform-spread-OFDM (DF-f-s-OFDM) symbol).

Table 1 shown below represents an example of a number of symbols per slot ($N^{slot}_{symb}$), a number slots per frame ($N^{frame,u}_{slot}$), and a number of, lots per subframe ($N^{subfrme,u}_{slot}$) in accordance with an SCS configuration (u), in a case where a normal CP is used.

TABLE 1

| SCS ($15*2^u$) | $N^{slot}_{symb}$ | $N^{frame,\ u}_{slot}$ | $N^{subframe,\ u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case Where an extended CP is used.

TABLE 2

| SCS ($15*2^u$) | $N^{slot}_{symb}$ | $N^{frame,\ u}_{slot}$ | $N^{subframe,\ u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3, Among the frequency ranges that are used in an NR system. FR1 may mean a "sub 6 GHz range", and FR2 may mean an "above 6 GHz range" and may also be referred to as a millimeter wave (mmW),

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
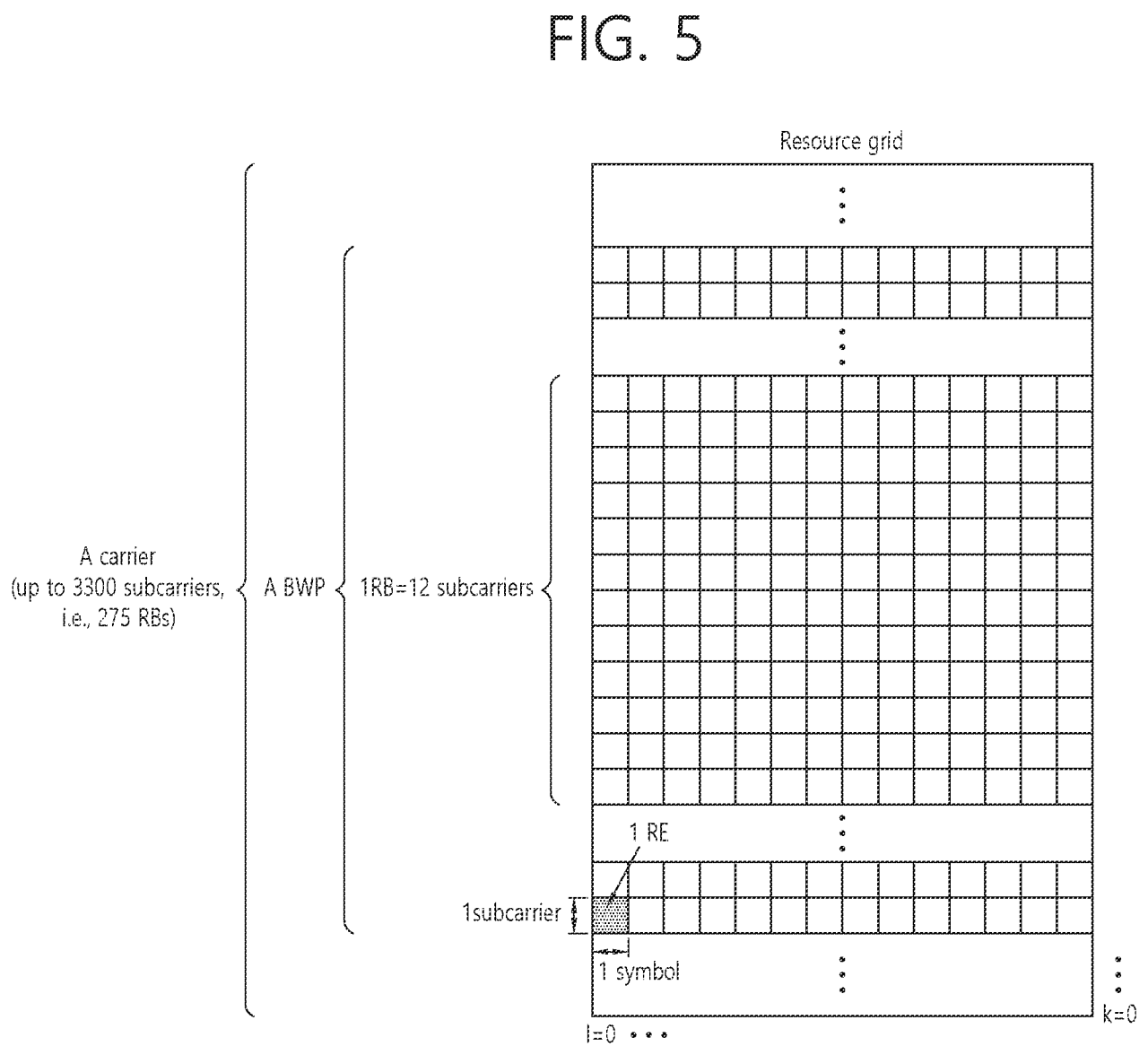

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain, A Bandwidth Part (BWP) may be defined as a plurality of consecutive (Physical) Resource Blocks ((P)RBs) in the frequency domain, and the MVP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RIM) outside the active DL BAT. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL MVP. For energy saving, if the UE fails to detect downlink control information (DCI) during a specific period, the UE max switch the active BWP of the LIE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu MVP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
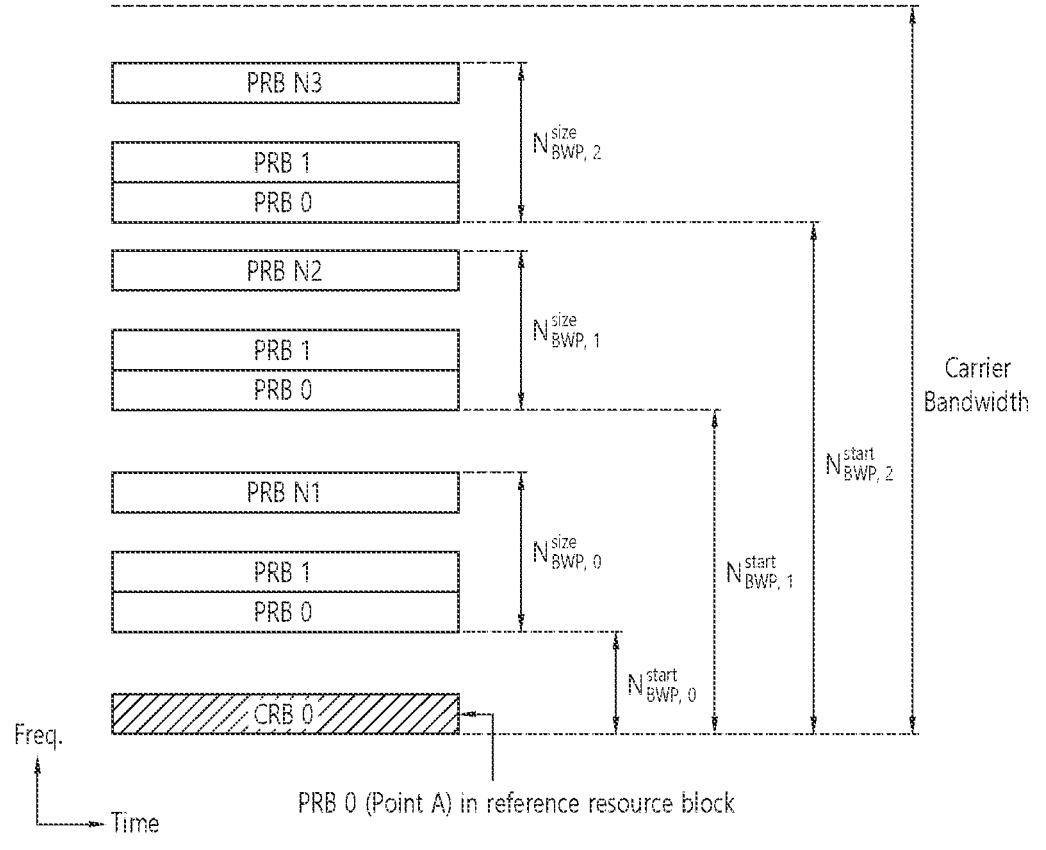
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A. and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SI, communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g, SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSBCH) in a carrier, and a transmission bandwidth may exist within a (pre-)configured sidelink (SL) BY/VP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X. or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the LIE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SE signal transmission thereof.

Hereinafter, resource allocation in SL will be described.

Figure 8:
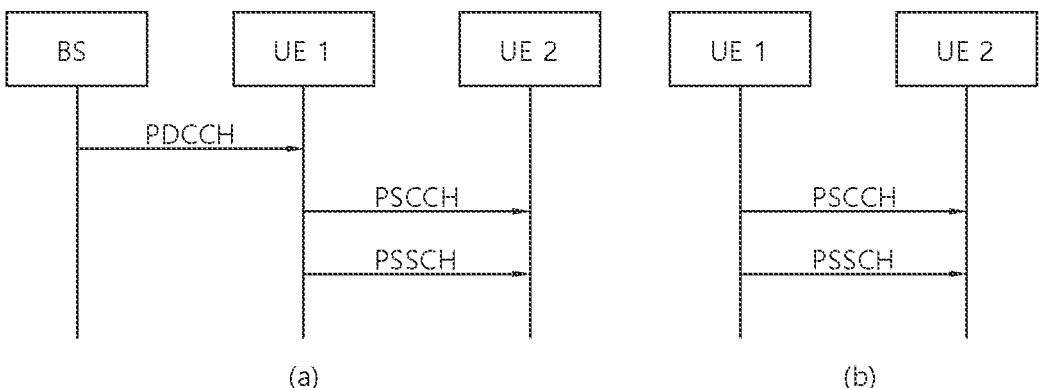
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LIE transmission mode 3. Alternatively, for example, (a) of FIG. 8 shows a UE operation related to an NR resource allocation mode 1. For example, the LIE transmission mode 1 may be applied to general SL communication, and the LTE transmission mode 3 may be applied to V2X Communication.

For example, (b) of FIG. 8 shows a UE operation related to an LIE transmission mode 2 or an LIE transmission mode 4. Alternatively, for example, (b) of FIG. 8 shows a UE operation related to an NR resource allocation mode 2.

Referring to (a) of FIG. 8, in the LIE transmission mode 1, the LIE transmission mode 3, or the NR resource allocation mode 1, a BS may schedule an SL resource to be used by the UE for SL transmission. For example, the BS may perform resource scheduling to a. UE 1 through a PDCCH (e.g., downlink control information (DCI)) or RRC signaling (e.g., Configured Grant Type 1 or Configured Grant Type 2), and the UE 1 may perform V2X. or SL communication with respect to a UE 2 according to the resource scheduling. For example, the UE, 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SI, resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
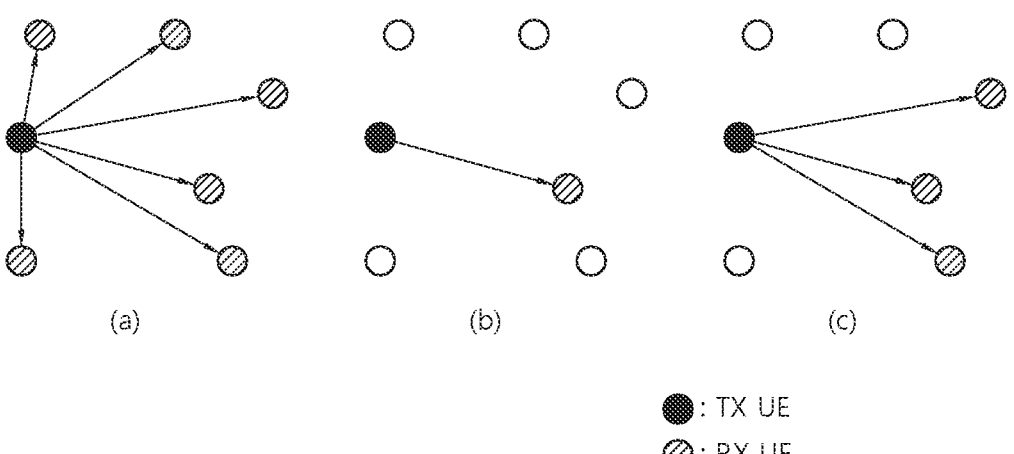
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(*a*) shows broadcast-type SL communication, FIG. 9(*b*) shows unicast type-SL communication, and FIG. 9(*c*) shows groupcast-type SL communication. In case of the unicast-type SL communication, a. UE may perform one-to-one communication with respect to another UE. In case of the groupcast-type SI, transmission, the UE may perform St, communication with respect to one or more UEs in a group to which the UE belongs. In various embodiments of the present disclosure, SI, groupcast communication may be replaced with SI, multicast communication, SI, one-to-many communication, or the like.

On the other hand, in NR V2X communication or NR sidelink communication, a transmitting UE may reserve/select one or more transmission resources for sidelink transmission (e.g., initial transmission and/or retransmission), a transmitting UE may inform the receiving UE of information on the location of the one or more transmission resources.

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving LIE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
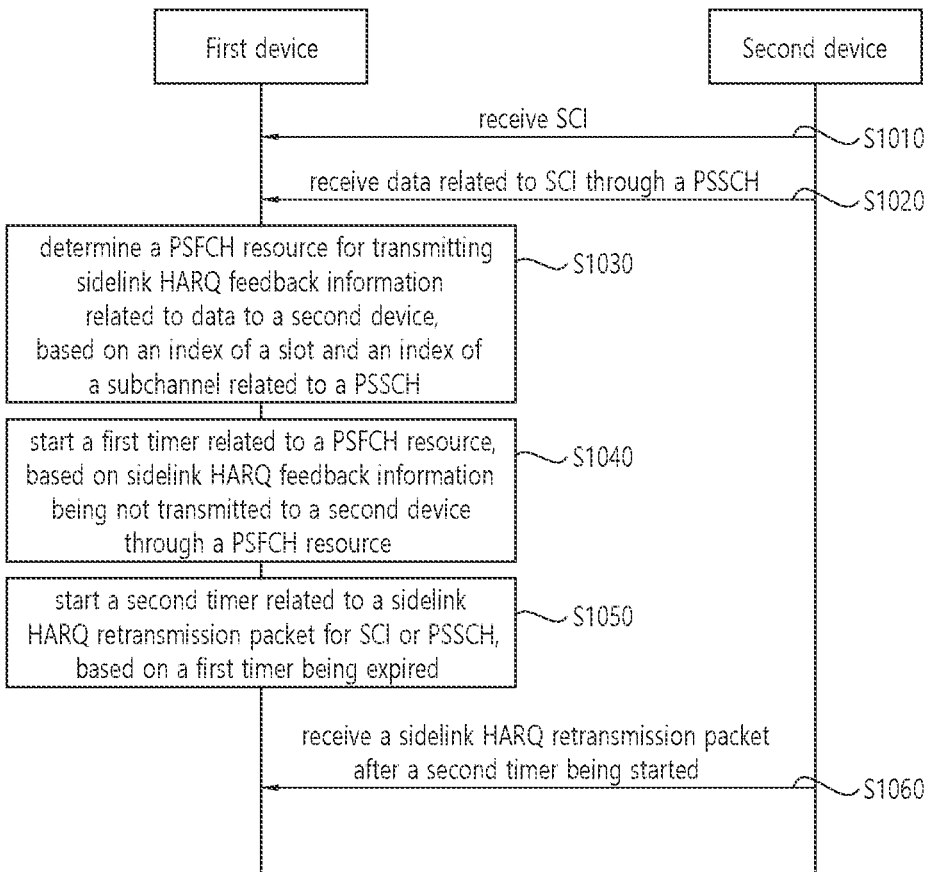
FIG. 10 shows a method for a first device and a second device to perform sidelink communication, according to an embodiment of the present disclosure.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCE in the case of a value of K=4. For example, (1)) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value e.g., 0). For example, in (a) and (h) of FIG. 10, if the transmitting, UE may transmit/signal to the receiving UE(s) only location information of the fourth transmission-related resource through the fourth (or last) transmission-related PSCCH, the transmitting UE may be configured or designate a field/bit of location information of unused or remaining, transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

FIG. 10 shows a method for a first device and a second device to perform sidelink communication, according to an embodiment of the present disclosure.

a retransmission timer (drx-RetransmissionTimerDL, drx-RetransmissionTimerUL) operates.

On the other hand, in some embodiments according to the present disclosure below, a method in which an RX UE receives a transport block (TB) for sidelink communication from a. TX UE and performs a power saving operation according to the state of HARQ feedback (HARQ ACK, HARQ NACK, HARQ DTX) for the received transport block in NR V2X is proposed.

Table 5 below shows an example of sidelink DRX configuration.

TABLE 5

| ● Sidelink DRX configurations |
| --- |
| ✓ SL drx-onDurationTimer: the duration at the beginning of a DRX Cycle; |
| ✓ SL drx-SlotOffset: the delay before starting the drx-onDurationTimer; |
| ✓ SL drx-InactivityTimer: the duration after the PSCCH occasion in which a PSCCH indicates a new SL transmission for the MAC entity; |
| ✓ SL drx-RetransmissionTimer-RX (per HARQ process): the maximum duration until PSCCH (Sidelink Control Information) & PSSCH for SL HARQ retransmission is received; |
| ✓ SL drx-LongCycleStartOffset: the Long DRX cycle and drx-StartOffset which defines the subframe where the Long and Short DRX Cycle starts; |
| ✓ SL drx-ShortCycle (optional): the Short DRX cycle; |
| ✓ SL drx-ShortCycleTimer (optional): the duration the UE shall follow the Short DRX cycle; |
| ✓ SL drx-HARQ-RTT-Timer-RX (per HARQ process): the minimum duration before PSCCH (Sidelink Control Information) & PSSCH for SL HARQ retransmission is expected by the RX UE's MAC entity. |

In step S1010, a first device according to an embodiment may receive SCI from a second device. In step S1020, a first device according to an embodiment may receive SCI-related data from a second device through a PSSCH. In step S1030, a first device according to an embodiment may determine a PSFCH resource for transmitting sidelink HARQ feedback information related to data to a second device based on an index of a slot and an index of a subchannel related to a. PSSCH. In step S1040, a first device according to an embodiment may start a first timer related to a PSFCH resource based on sidelink HARQ feedback information being not transmitted to a second device through the PSFCH resource. In step S1050, the first device according to an embodiment may start a second timer related to a sidelink HARQ retransmission packet for SCI or PSSCH based on that the first timer has expired. In step S1060, a first device according to an embodiment may receive a sidelink HARQ retransmission packet after a second timer is started.

Hereinafter, embodiments and/or examples that may be directly or indirectly related to at least one of steps S1010 to S1060 will be reviewed. On the other hand, the following embodiments and/or examples are only related to at least one of steps S1010 to S1060, so a somewhat different feature should not be construed as deviating from the scope of the present specification, even if at least one of the following embodiments and/or examples and steps S1010 to S1060 is somewhat different in content.

On the other hand, NR V2X of Release 16 did not support a power saving operation of a user equipment (UE), and it is planned to support a power saving operation of the UE from NR V2X of Release 17.

Meanwhile, in a Uu discontinuous reception (DRX) operation according to an embodiment, Timers such as drx-HARQ-RTT-TimerDL, drx-HARQ-RTT-TimerUL, drx-RetransmissionTimerDL, and drx-RetransmissionTimerUL are defined, so that in case of performing UE HARQ retransmission, a UE transitions to a sleep mode while a round trip time (RTT) timer (drx-HARQ-RTT-TimerDL, drx-HARQ-RTT-TimerUL) or maintain an active state while Referring to Table 5, SE drx-RetransmissionTimer-RX according to an embodiment may indicate a maximum time interval until PSCCH (sidelink control information) and PSSCH for SL HARQ retransmission are received. For example, SL drx-RetransmissionTimer-RX may be defined as a time for an RX UE to monitor a PSCCH and/or PSSCH to receive an SL HARQ retransmission transmitted by a TX UE. An RX UE may start operation of receiving a PSCCH and/or PSSCH for SL HARQ retransmission transmitted by a TX UE by transitioning to an active state when an SL drx-HARQ-RTT-Timer-RX timer expires and starting the SE drx-RetransmissionTimer-RX timer. When an SL HARQ retransmission transmitted by a TX UE is received while an SL drx-RetransmissionTimer-RX timer is running, an RX UE may stop the SL drx-RetransmissionTimer-RX timer.

Referring to Table 5, SL drx-HARQ-RTT-Timer-RX according to an embodiment may represent a minimum time interval before PSCCH (sidelink control information) and; or PSSCH for SL HARQ retransmission is expected by a MAC entity of an RX UE. For example, SL drx-HARQ-RTT-Timer-RX may be defined as a minimum time required to monitor PSCCH and/or PSSCH for sidelink HARQ retransmission packet transmitted by a TX UE, when a MAC entity of an RX UE receives and successfully decodes the PSCCH (sidelink control information) transmitted by a TX UE, and fails to decode the received PSSCH (sidelink data) and transmits the HARQ NACK to the TX UE. That is, it may mean that a PSCCH and/or PSSCH for SL HARQ retransmission is not transmitted from a TX UE before an SL drx-HARQ-RTT-Timer-RX expires. RX UE, may operate in sleep mode while SL drx-HARQ-RTT-Timer-RX is operating, and if SL dix-HARQ-RTT-Timer-RX is expired, may transition to an active state and start an SL drx-Retransmission-Timer-RX timer.

In some embodiments below, a method of power saving based on operations of SL drx-HARQ-RTT-Timer-RX and SL drx-retransmissionTimer-RX of an RX UE performing sidelink communication may be provided.

In an embodiment, with respect to an operation of SL drx-HARQ-RTT-Timer-RX and SL drx-retransmission- Timer of an RX UE, in a HARQ feedback disabled mode, a Tx UE may transmit SL packets to an Rx UE through blind retransmission. At this time, since an Rx UE does not transmit SI. HARQ feedback, it may not be able to operate the RTT/retransmission timer based on PSFCH transmission as in HARQ feedback enabled. Therefore, when an Rx UE receives a PSSCH transmitted by a Tx UE, it is necessary to start a retransmission timer to ensure reception of blind retransmission (including additional transmission) packets transmitted by the Tx UE.

In an embodiment, an inactivity timer, a HARQ RTT timer, and/or a retransmission timer may each independently operate, an inactivity timer is a common DRX timer, when an Rx UE receives a new TB from a Tx UE, the Rx UE may start an inactivity timer and monitor whether there is additional SL data transmitted by the Tx UE. When an Rx UE receives a PSSCH (new TB) transmitted by a Tx UE and operates an inactivity timer, and HARQ NACK occurs at the same time, the Rx UE may operate a HARQ REF timer/ retransmission timer independently of an inactivity timer. Meanwhile, art SL HARQ RTT timer/retransmission timer may be a timer operated per sidelink process or per HARQ process, Therefore, a TX UE and an RX UE may operate according to the following process. i) A transmitting UE may transmit a PSSCH (new TB) to a receiving UE (e.g., HARQ disabled). ii) A receiving UE may start an SL DRX inactivity timer based on a reception of a PSSCH and monitor a new additional PSSCH, iii) A receiving UE may start a HARQ RTT/retransmission timer and monitor blind retransmission packets. iv) A transmitting UE may transmit a new PSSCH (new TB). v) A transmitting UE may transmit a blind retransmission packet for i) to a receiving UE, vi) A transmitting UE may transmit a blind retransmission packet for i) back to a receiving UE. Thereafter, it may be expired/ terminated after an inactivity timer is started, and after that, it may be expired/terminated after a HARQ RTT/retransmission timer is started.

In some embodiments of the present disclosure below, it describes an operation of receiving a sidelink DRX operation of an RX UE and/or a sidelink HARQ retransmission of the RX UE.

In one embodiment (or in a first embodiment), when an RX UE successfully decodes a PSCCH (Sidelink Control Information) transmitted by a TX UE, but fails to decode the PSSCH and transmits a HARQ NACK to the TX UE, the RX UE may start a Sidelink HARQ-RTT-Timer-RX timer and transition to sleep mode. When an SL drx-HARQ-RTT-Timer-RX timer expires, an RX UE transitions to an active mode to receive a PSCCH and PSSCH for a SL HARQ retransmission packet transmitted by a TX UE, starts an SI, dix-RetransmissionTimer-RX timer, and may receive the PSCCH and PSSCH transmitted by the TX UE. Upon receiving a PSCCH and PSSCH for SL HARQ retransmission transmitted by a TX UE, an RX UE may stop an SL drx-RetransmissionTimer-RX timer. If an RX UE receives a PSCCH and PSSCH for SL HARQ retransmission transmitted by a TX UE, but the decoding of the PSSCH fails again (PSCCH decoding succeeds, PSSCH decoding fails) and transmits a HARQ NACK to the TX UE, the RX UE may restart a Sidelink HARQ-RTT-Timer-RX timer and transition to sleep mode until the Sidelink HARQ-WIT-Timer-RX expires. When a Sidelink HARQ-RTT-Tinier-RX timer expires, an RX UE may start an SL drx-Retransmission-Timer timer by transitioning back to the active state to receive a PSCCH and PSSCH for SL HARQ retransmission retransmitted by a TX UE. When an RX UE receives a PSCCH and PSSCH for SL HARQ retransmission transmitted by a TX UE, the RX UE may stop an SL drx-RetransmissionTimer.

In one embodiment (or in the second embodiment), when a TX UE transmits by setting a HARQ feedback option to HARQ feedback Disable (even if PSSCH decoding fails, HARQ NACK is not transmitted to a TX UE. The TX LIE performs retransmission with blind retransmission) to an RX UE through PSCCH (SCI), the TX UE may perform an operation for an RX UE to receive sidelink DRX and sidelink HARQ retransmission as follows. That is, when an RX UE successfully decodes SCI transmitted by a TX UE but fails to decode a PSSCH, the sidelink retransmission packet transmitted by the TX UE through blind retransmission without transmitting HARQ NACK feedback to the TX UE may be received. Therefore, when an RX UE successfully decodes SCI (including information indicating HARQ feedback Disabled) transmitted by a TX UE, but fails to decode a PSSCH, the RX UE may start an Sidelink HARQ-RTT-Timer-RX timer and transition to a sleep mode. That is, an RX UE may determine that a TX UE does not perform blind retransmission until an SL drx-HARQ-RTT-Timer-RX timer expires and may transition to a sleep mode. When an SL drx-HARQ-RTT-Timer-RX timer expires, an RX UE may transition to an active mode to receive a packet retransmitted by a TX UE in blind retransmission, start SL drx-RetransmissionTimer-RX, and receive the retransmission packet transmitted by the TX UE. When an RX UE receives a PSCCH and a PSSCH for blind retransmission transmitted by a TX LIE, the RX UE may stop an SL drx-RetransmissionTimer-RX tuner. If an RX UE fails again to decode a PSSCH for blind retransmission transmitted by a TX UE (decoding for PSCCH indicating HARQ feedback Disabled is successful, PSSCH decoding fails), the TX UE, the RX UE may restart an Sidelink HARQ-RTT-Timer-RX timer and operate in sleep mode while the timer is running. When an Sidelink HARQ-RTT-Timer-RX timer expires, an RX UE may start an SL drx-RetransmissionTimer-RX by transitioning back to an active state to receive a PSCCH and PSSCH for blind retransmission that a TX UE retransmits. When an RX UTE receives a PSCCH and a PSSCH for blind retransmission transmitted by a TX UE, the RX UE may stop an SI, drx-RetransmissionTimer.

In one embodiment (or in a third embodiment), when a TX UE transmits by setting the HARQ feedback option to HARQ feedback disable (HARQ ACK is not transmitted to the TX UE even if a PSSCH decoding is successful. The TX UE performs retransmission by blind retransmission. An RX UE receives the retransmission packet that the TX UE blindly retransmits) through PSCCH (SCI) to the RX UE, the RX UE may perform a reception operation of sidelink DRX and sidelink HARQ retransmission. That is, when an RX UE successfully decodes a PSCCH (SCI) transmitted by a TX UE and also succeeds in decoding the PSSCH, the RX LIE may not transmit a HARQ ACK feedback to the TX UE. And the RX UE may receive a retransmission packet transmitted by the TX UE through blind retransmission. Therefore, even if an RX UE successfully decodes SCI (including information indicating HARQ feedback Disabled) transmitted by a TX UE and succeeds in decoding a PSSCH, when the RX UE is indicated as HARQ feedback Disabled by the HARQ feedback option through the PSCCH (e.g., sidelink control information), the RX UE may transition to a sleep mode while successfully receiving a PSCCH and PSSCH and starting an Sidelink HARQ-RTT-Timer-RX timer. When an SL drx-HARQ-RTT-Timer-RX timer expires, an RX UE may transition to an active mode, start an SL drx-RetransmissionTimer-RX timer in order to receive the PSCCH and PSSCH for the packet retransmitted by the TX UE in blind retransmission, and receive a PSCCH and PSSCH for sidelink blind retransmission transmitted by a TX UE. Upon receiving a PSCCH and PSSCH for blind retransmission transmitted by a TX UE, an RX UE may stop SL drx-RetransmissionTimer. In addition, if the decoding of the blind retransmission packet transmitted by a TX UE succeeds or fails (decoding for the PSCCH including information indicating HARQ feedback Disabled is successful, PSSCH decoding fails), an RX UE may start an Sidelink HARQ-RTT-Timer-RX timer and operate in sleep mode until it monitors a PSCCH and PSSCH for the next blind retransmission. When an Sidelink HARQ-RTT-Timer-RX timer expires, an RX UE may transition to an active mode and start an SL drx-RetransmissionTimer-RX timer to receive a PSCCH and PSSCH for blind retransmission that a TX UE retransmits.

In relation to the second embodiment or the third embodiment, when an RX LIE according to an embodiment receives HARQ disabled (packet) transmission from a TX UE may start an SI, drx-RetransmissionTimer-RX timer on the corresponding HARQ disabled packet. For example, an RX LIE may start a Sidelink (SL) HARQ-RTT-Timer-RX timer for the corresponding HARQ disabled packet.

In an embodiment, an RX UE may start Sidelink (SL) HARQ-IM-Timer-RX and/or SL drx-RetransmissionTimer-RX based on the success/failure of decoding for a PSSCH related to the corresponding HARQ disabled packet.

In one example, an RX UE may not transmit an ACK to a TX UE even if decoding for a PSSCH related to a HARQ disabled packet is successful, and may start Sidelink (SL) HARQ-RTT-Timer-RX and/or SL drx-Retransmission-Timer-RX related to the HARQ disabled packet.

In one example, an RX UE may not transmit a NACK to a TX UE even if decoding for a PSSCH related to a HARQ disabled packet fails, and may start Sidelink (SL) HARQ-RTT-Timer-RX and/or SL drx-RetransmissionTimer-RX related to the HARQ disabled packet.

In one embodiment (or in the fourth embodiment), when an RX UE successfully decodes a PSCCH (sidelink control information) regardless of the success/failure of decoding for a PSSCH (sidelink data) transmitted by a TX UE, the RX UE may start an Sidelink HARQ-RTT-Timer-RX timer and transition to sleep mode. When an SL drx-HARQ-RTT-Timer-RX timer expires, an RX UE may transition to an active mode to receive a PSCCH and PSSCH for an SL HARQ retransmission packet transmitted by a TX LIE, may start an SL drx-RetransmissionTimer-RX timer, and may receive a PSCCH and PSSCH transmitted by the TX LIE. Upon receiving a PSCCH and PSSCH for SL HARQ retransmission transmitted by a TX UE, an RX UE may stop an SL drx-RetransmissionTimer timer. If the decoding of a PSCCH for SL HARQ retransmission transmitted by a TX UE is successful, an RX UE may restart an Sidelink HARQ-RTT-Timer-RX timer and transition to sleep mode until an Sidelink HARQ-RTT-Timer-RX timer expires. When an Sidelink HARQ-RTT-Timer-RX timer expires, an RX UE transitions back to the active state to receive a PSCCH and PSSCH for SL HARQ retransmission retransmitted by a TX UE, and may start an SL drx-RetransmissionTimer-RX timer. When an RX UE receives a PSCCH and a PSSCH for SL HARQ retransmission transmitted by a TX UE, the RX UE may stop an SL drx-RetransmissionTimer.

In one embodiment (or in a fifth embodiment), when an RX UE succeeds in decoding a PSCCH (SCI) transmitted by a TX UE and fails to decode a PSSCH (SL data), the RX UE should transmit SL HARQ NACK to the TX UE, but if it cannot transmit due to the following reasons, it may start an Sidelink HARQ-RTT-Timer-RX timer and transition to sleep mode (since the TX UE can send the SL HARQ retransmission packet to the RX UE even if the SL HARQ NACK is not transmitted to the TX UE, the Sidelink HARQ-RTT-Timer-RX timer must be started).

(Reason) When an RX UE also has SL data (e.g., SL HARQ feedback) to be transmitted to the counterpart UE and UL data to be transmitted to a base station occurs at the same time, the RX UE may compare the SL data and the UL data with priority, and may transmit data having a higher priority first. If the priority of UL data is high in the priority comparison, there may be a problem in that an SI, HARQ feedback cannot be transmitted to a TX UE and UL data must be transmitted to a base station.

When an SL drx-HARQ-RTT-Tither-RX timer expires, an RX UE may start an SL drx-RetransmissionTimer-RX timer by transitioning to an active mode to receive a PSCCH and PSSCH for an SL HARQ retransmission packet transmitted by a TX LIE, and may receive the PSCCH and PSSCH the TX UE transmits. When an RX UE receives a PSCCH and PSSCH for SI, HARQ retransmission transmitted by a TX UE, the RX UE may stop an SL drx-RetransmissionTimer-RX timer. If PSCCH and PSSCH for SL HARQ retransmission transmitted by a TX UE are received, but decoding of PSSCH fails again (decoding of PSCCH succeeds, decoding of PSSCH fails), and HARQ NACK is transmitted to the TX UE, an RX UE may restart an Sidelink HARQ-RTT-Timer-RX timer and transition to sleep mode until an Sidelink HARQ-RTT-Timer-RX timer expires. When an Sidelink HARQ-RTT-Timer-RX timer expires, an RX UE may start an SL drx-RetransmissionTimer-RX timer by transitioning back to an active state to receive a PSCCH and PSSCH for SL HARQ retransmission that a TX LIE retransmits. When an RX UE receives a PSCCH and PSSCH for SL HARQ retransmission transmitted by a TX LIE, the RX UE may stop an SL drx-RetransmissionTimer.

In an embodiment, an operation of an RTT/Retransmission Timer or SL DRX operation) due to PSFCH dropping of an Rx UE (due to prioritization between SL and UL or prioritization between LTE SL and NR SL) may be proposed. In one example, in case of HARQ feedback Enabled MAC PDU, i) (in the case of successful decoding) a receiving UE should be able to monitor a reception of a retransmission packet of a Tx UE by starting an RTT/Retransmission timer if SL data is successfully received (decoding succeeded), since the transmitting UE may misjudgment it as a decoding failure even though a PSFCH has not actually been transmitted. ii) (In the case of decoding failure) if a receiving UE fails to receive SL data (decoding failure), it should be able to monitor whether a Tx UE's retransmission packet is received by starting an RTT/Retransmission timer, since the transmitting UE may misjudgment it as a decoding failure even though a PSFCH has not actually been transmitted.

In an embodiment, an SL DRX operation of an Rx UE when a HARQ feedback Disabled MAC PDU is transmitted from a TX UE may be provided. In one example, a receiving UE may start an RTT/Retransmission timer when receiving SL data (decoding success or decoding failure), so that the RX UE can monitor the next HARQ feedback Disabled MAC PDU (blind transmission) transmitted by a Tx UE.

In an embodiment, an SL drx-HARQ-RTT-Timer-RX and/or an SL drx-RetransmissionTimer-RX may operate based on the contents of Table 6 below.

TABLE 6

| Agreements on details of timer |
|---|
| 1: The following parameters are supported as part of the SL DRX configuration for all cast types: sl-drx-StartOffset, sl-drx-Cycle, sl-drx-onDurationTimer, and sl-drx-SlotOffset |
| 2: Ths RX UE determines the symbol/slot/subframe associated with the start of the DRX cycle using the configured sl-drx-Cycle, sl-drx-StartOffset, FFS on details. |
| 3: The RX UE starts the sl-drx-onDurationTimer after sl-drx-slotOffset from the beginning of the subframe. |
| 4: The RX UE's active time includes the time in which sl-drx-on-DurationTimer is running. |
| 5: For unicast, the TX UE behaviors should be specified to keep aligned with the RX UE regarding the DRX Active time. FFS the specific Spec impacts needed at the TX side. |
| 6: For unicast, the RX UE maintains a separate SL inactivity timer for each pair of src/dest L2 ID. |
| 7: For unicast, the SL inactivity timer value may take into consideration the QoS. Whether any specification impacts are needed is FFS. |
| 8: For unicast, RX UE starts/restarts the inactivity timer with the value configured for that pair of src/dest L2 ID. |
| 9: For unicast, the RX UE (re)starts the inactivity timer upon reception of a new SL data transmission from the RX UE perspective for that pair of src/dest L2 ID. |
| 10: For unicast, the RX UE (re)starts the inactivity timer based on information in SCI (SCI1 + SCI2). FFS if the MAC layer can stop the inactivity timer. |
| 11: For unicast the RX UE (re)starts the inactivity timer in the first slot after SCI (SCI1 + SCI2) reception. |
| 12: For unicast, the TX UE maintains a timer corresponding to the SL Inactivity timer in the RX UE for each pair of src/dest L2 ID and uses the timer as part of criterion for determining the allowable transmission time for the RX UE. |
| 13: For unicast, the TX UE (re)starts its timer corresponding to the SL inactivity timer at the RX UE at the slot following an SCI transmission indicating a new data transmission. FFS the specific spec impacts needed at the TX side.. |
| 14: SL Inactivity timer is supported for groupcast. FFS on the scenarios where it is supported. |
| 15: SL Inactivity timer is not supported for broadcast transsisions. | in an embodiment, an SL drx-HARQ-RTT-Timer-RX and/or an SL drx-RetransmissionTimer-RX may operate 30 based on the contents of Table 7 below.

TABLE 7

| |
|---|
| 16: The RX UE is active on sidelink (monitors SGI1 + SCI2) as long as at least one of the SL inactivity timers associated with unicast or groupcast (if supported) is running. |
| 17: As a baseline, agreements 7-13 inclusive are applied to SL inactivity timer for groupcast, with the difference that "src/dest L2 ID pair" is replaced with "groupcast L2 destination ID or src/dest L2 id pair" (dependent on the conclusion of proposal 17). Any specific handling which may be needed for synchronization of inactivity timers for the groupcast case is FFS. |
| 18: SL HARQ RTT timer and SL HARQ retransmission timer are maintained per SL HARQ process at the RX UE. |
| 19: Working assumption: SL HARQ RTT timer can be derived from the retransmission resource timing when the SCI indicates a retransmission resource. FFS whether explicitly configured SL HARQ RTT timer may be still required. If big problem is identified next meeting, we can revisit it. |
| 20: The value(s) of the SL HARQ RTT Timer, when explicitly configured and not determined via SCI (if agreed to do so), is determined by UE or NW implementation. |
| 21: For unicast, sidelink retransmission timer can be supported for at least some cases of HARQ disabled transmissions. FFS whether HARQ RTT is supported or not. |
| 22: For transmissions with HARQ feedback, the RX UE starts SL HARQ RTT timer in the symbol/slot following the end of PSFCH transmission. |
| 23: If the RX UE does not transmit PSFCH for a HARQ enabled transmission (e.g. due to UL/SL prioritization) the RX UE still starts the HARQ RTT timer in the symbol/slot following the end of PSFCH resource. |
| 24: For cases where there is some uncertainty in the timing of a retransmission for a HARQ process (e.g. due to no retransmission resource indicated in the SCI, or possible reselection by the TX UE) the RX UE uses a configured retransmission timer. |
| 25: Retransmission timer can be started upon expiry of the HARQ RTT timer. |
| 26: The values(s) of the SL retransmission timer can be determined by UE or NW implementation. |
| 27: The SL active time of the RX UE includes the time in which any of its applicable sl-drx-OnDuration(s), sl-DRXInactivityTimer(s), or sl-drx-RetransmissionTimer(s) are running. |
| 28: Working assumption: The slots when the UE is expected CSI report following a CSI request is considered as SL active time. |
| 29: RAN2 assumes LCP enhancements for ensuring a TX UE transmits data in the active time of an RX UE are needed. FFS on the resource (re)selection enhancements (e.g. limiting the resources to the active time for peer UE). |

In an embodiment, an SL drx-HARQ-RTT-Timer-RX and/or an SL drx-RetransmissionTimer-RX may operate based on the contents of Table 8 below,

TABLE 8

Proposal 24 For transmissions will HARQ feedback, the RX UE starts the SL HARQ RTT timer in the symbol/slot following the end of PSFCH transmission.
Proposal 25 if the RX UE does not transmit PSFCH for a HARQ enabled transmission (e.g. due to UL/SL prioritization) the RX UE still starts the HARQ RTT timer in the symbol/slot following the end of PSFCH resource.

In an embodiment, an SL drx-HARQ-RTT-Timer-RX and/or an SL drx-RetransmissionTimer-RX may operate based on the contents of Table 9 below.

TABLE 9

✓ If the RX UE does not transmit PSFCH for a HARQ enabled transmission (e.g. due to UL/SL prioritization) the RX UE still starts the HARQ RTT timer.
✓ If SL HARQ RTT timer is supported for HARQ disabled transmissions, the RX UE starts the SL HARQ RTT timer in the symbol/slot following SCI (SCI1 + SCI2) reception.
✓ SL HARQ RTT timer and SL HARQ retransmission timers are mainatined per SL HARQ process at the RX UE.
✓ Sidelink HARQ RTT and sidelink retransmission timers are supported for HARQ disabled transmissions.

Figure 11:
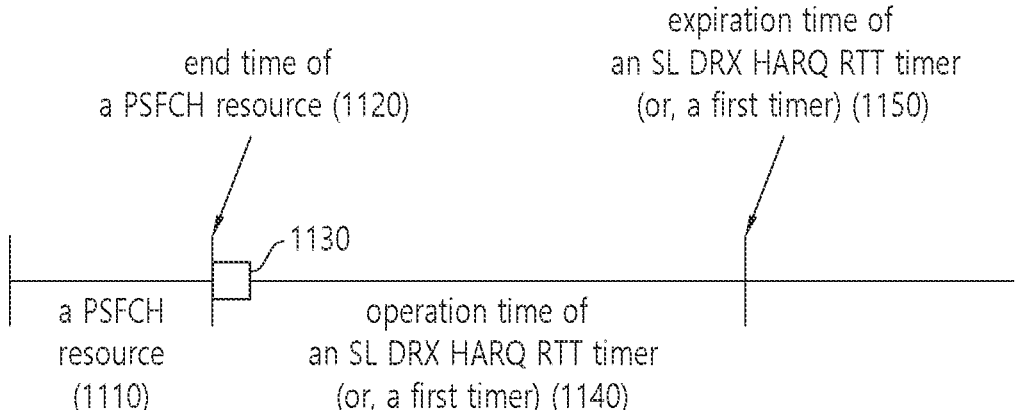
FIG. 11 shows an example of when a first timer is started.

FIG. 11 shows an example of when a first timer is started.

In an embodiment, an RX UE (in an example, may correspond to a first device to be described later in FIGS. 13 and 14) that has received sidelink data through a PSSCH from a TX UE (in an example, may correspond to a second device to be described later in FIGS. 13 and 14) may determine a PSFCH resource 1110 for transmitting sidelink HARQ feedback information related to the data to the second device, based on an index of a slot and an index of a subchannel related to a PSSCH.

An RX LIE according to an embodiment may start an SL DRX HARQ RTT timer (or a first timer), at a slot and/or symbol 1130 following the end time 1120 of a PSFCH resource 1110. In one example, an RX UE may start an SI, DRX HARQ RTT timer (or first timer) related to the PSFCH resource 1110, based on sidelink HARQ feedback information being not transmitted from (RX UE) to TX UE through the PSFCH resource 1110.

For example, sidelink HARQ feedback information may not be transmitted to the TX UE through the PSFCH resource 1110 based on a first priority value related to the sidelink HARQ feedback information. In a more specific example, the sidelink HARQ feedback information may not be transmitted to the TX UE, based on the first priority value being greater than a second priority value related to an uplink transmission to a base station.

The RX UE according to an embodiment may start an SL DRX Retransmission timer (or a second timer), after a time point 1150 when an SL DRX HARQ RTT timer (or a first timer) expires after the operation period 1140 of the SI. DRX HARQ RTT timer (or the first timer) has elapsed. In one example, an RX UE may receive a sidelink HARQ retransmission packet from a TX UE after the SL DRX Retransmission timer (or second timer) is started.

Figure 12:
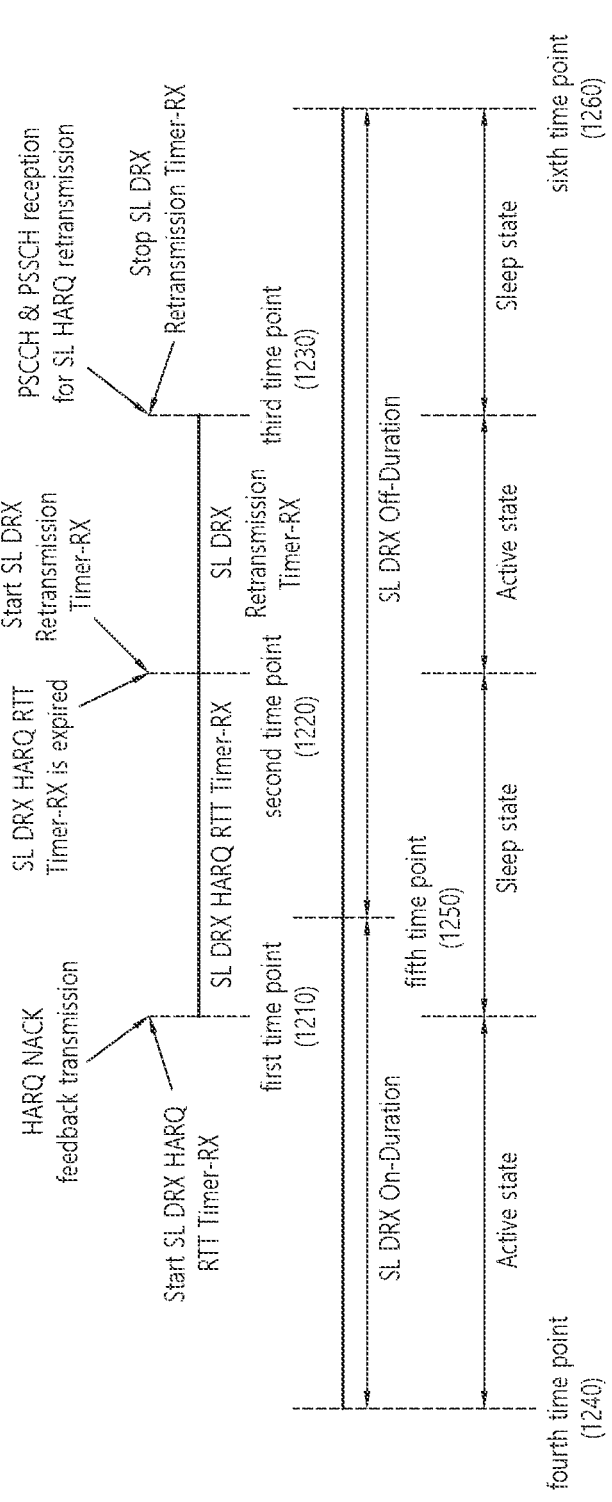
FIG. 12 shows an example of a method for an RX UE to save power consumption for sidelink communication according to an embodiment.

FIG. 12 shows an example of a method for an RX UE to save power consumption for sidelink communication according to an embodiment.

More specifically, FIG. 12 shows an embodiment of a method for an RX UE to save power based on an operation of an RX SL HARQ RTT Timer-RX operation and an SL DRX retransmission timer-RX operation proposed by some of the embodiments of the present disclosure.

As in FIG. 12, when an RX UE successfully decodes a PSCCH (sidelink control information) transmitted by a TX UE, but fails to decode the PSSCH and transmits a HARQ NACK to the TX UE, an RX UE may start a Sidelink HARQ-RTT-Timer-RX timer and transition to sleep mode. When an SL drx-HARQ-RTT-Timer-RX tinier expires, an RX UE may transition to the active mode to receive a PSCCH and PSSCH for an SL HARQ retransmission packet transmitted by a TX UE, may start an SL drx-RetransmissionTimer-RX timer, and may receive the PSCCH and PSSCH transmitted by the TX UE. Upon receiving a PSCCH and PSSCH for SL HARQ retransmission transmitted by a TX UE, an RX UE may stop an SL drx-RetransmissionTimer-RX timer.

Some of the various embodiments of the present disclosure provide a method for enabling an RX UE operating in sidelink DRX to efficiently receive a PSCCH and a PSSCH for sidelink HARQ retransmission transmitted by a TX LIE through switching between sleep mode and active mode. That is, it was intended to ensure that an RX UE receives a PSCCH and a PSSCH transmitted by a TX UE while operating in a power saving mode.

Various embodiments of the present disclosure may be combined with at least one of a power control operation of a UE, a congestion control operation of a UE, a channel coding operation of a UE, and/or an SL HARQ feedback operation of a UE.

FIG. 13 is a flowchart showing a method for a first device to perform sidelink communication according to an embodiment of the present disclosure.

Operations disclosed in the flowchart of FIG. 13 may be performed in combination with various embodiments of the present disclosure. In one example, the operations disclosed in the flowchart of FIG. 13 may be performed based on at least one of the devices illustrated in FIGS. 15 to 20. In one example, the first device of FIG. 13 may correspond to the first wireless device 100 of FIG. 16 to be described later, and the second device may correspond to the second wireless device 200 of FIG. 16. In another example, the first device of FIG. 13 may correspond to the second wireless device 200 of FIG. 16 to be described later, and the second device may correspond to the first wireless device 100.

In step S1310, a first device according to an embodiment may receive sidelink control information (SCI) from a second device.

In step S1310, a first device according to an embodiment may receive data related to the SCI, from the second device, through a physical sidelink shared channel (PSSCH).

In step S1330, a first device according to an embodiment may determine a physical sidelink feedback channel (PSFCH) resource for transmitting sidelink hybrid automatic repeat request (HARQ) feedback information related to the data to the second device, based on an index of a slot and an index of a subchannel related to the PSSCH.

In step S1340, a first device according to an embodiment may start a first timer related to the PSFCH resource, based on the sidelink HARQ feedback information not being transmitted to the second device through the PSFCH resource.

In step S1350, a first device according to an embodiment may start a second timer related to a sidelink HARQ retransmission packet for the SCI or the PSSCH, based on the first timer being expired.

In step S1360, a first device according to an embodiment may receive the sidelink HARQ retransmission packet from the second device, after the second timer is started.

In an embodiment, the first timer may correspond/be same/be similar to the above-described SL drx-HARQ-RTT-Timer-RX, and the second timer may correspond/be same/be similar to the above-described SL drx-RetransmissionTimer-RX.

In an embodiment, the sidelink HARQ feedback information may be not transmitted to the second device through the PSFCH resource, based on a first priority related to the sidelink HARQ feedback information.

In an embodiment, the sidelink HARQ feedback information may be not transmitted to the second device, based on the first priority being lower than a second priority related to an uplink transmission to a base station.

In an example, the first device may give priority to UL when the priority value of UL data is less than a UL threshold, by comparing a priority value of UL data for uplink transmission to the base station with a UL threshold value for prioritization. In other words, it may be determined that the second priority is higher than the first priority. In this case, SL transmission for transmitting the sidelink HARQ feedback information may be dropped and UL transmission may be performed.

In another example, by comparing the priority value of the UL data with the UL threshold, if the priority value of the UL data is greater than the UL threshold, the first device may compare the priority of the SL data and the SL threshold for prioritization. By comparing the priority of the SL data regarding the transmission of the sidelink HARQ feedback information and the SL threshold, if the priority value of the SL data is less than the SL threshold, the first device may give priority to SL. In other words, it may be determined that the first priority is higher than the second priority. In this case, the UL transmission may be dropped and SL transmission may be performed. Conversely, if the priority value of the SL data is greater than the SL threshold, priority may be given to the UL (In other words, it may be determined that the second priority is higher than the first priority).

In an embodiment, the first timer may be started at a symbol or a slot following the end time of the PSFCH resource.

The first device according to an embodiment may start the first timer based on the sidelink HARQ feedback information being transmitted to the second device through the PSFCH resource.

In an embodiment, the first timer may be started at a symbol or slot subsequent to the end time of PSFCH transmission based on the sidelink HARQ feedback information.

In an embodiment, the first timer and the second timer may be maintained per sidelink HARQ process of the first device.

In an embodiment, the sidelink HARQ feedback information may not be transmitted to the second device, based on the first priority being lower than a third priority related to a sidelink transmission to a third device or a sidelink reception from the third device.

In an embodiment, sidelink communication based on a first wireless radio access technology (RAT) may be performed between the first device and the second device, sidelink communication based on a second wireless RAT may be performed between the first device and the third device.

In an embodiment, at least one of the first wireless RAT or the second wireless RAT may be new radio (NR) or long-term evolution (LTE).

In an embodiment, monitoring for receiving the sidelink HARQ retransmission packet from the second device may not be performed in a time interval in which the first timer operates.

In an embodiment, monitoring for receiving the sidelink HARQ retransmission packet from the second device may be performed in a time interval in which the second timer operates.

In an embodiment, the first device may be in a discontinuous reception (DRX) active state capable of receiving a signal from the second device, in the time interval in which the second timer operates.

In an embodiment, the second timer may be stated by the first device, based on the data being received through a HARQ disabled transmission of the second device.

According to an embodiment of the present disclosure, a first device for performing sidelink communication may be proposed. The first device may comprise: one or more memories storing instructions; one or more transceivers; and one or more processors connected to the one or more memories and the one or more transceivers, wherein the one or more processors may execute the instructions to: receive sidelink control information (SCI) from a second device; receive data related to the SCI, from the second device, through a physical sidelink shared channel (PSSCH); determine a physical sidelink feedback channel (PSFCH) resource for transmitting sidelink hybrid automatic repeat request (HARQ) feedback information related to the data to the second device, based on an index of a slot and an index of a subchannel related to the PSSCH; start a first timer related to the PSFCH resource, based on the sidelink HARQ feedback information not being transmitted to the second device through the PSFCH resource; start a second timer related to a sidelink HARQ retransmission packet for the SCI or the PSSCH, based on the first timer being expired; and receive the sidelink HARQ retransmission packet from the second device, after the second timer is started, wherein the sidelink HARQ feedback information may be not transmitted to the second device through the PSFCH resource, based on a first priority related to the sidelink HARQ feedback information.

According to an embodiment of the present disclosure, a device (or a chip(set)) adapted to control a first user equipment (UE) may be proposed. The device may comprise: one or more processors; and one or more memories operably connectable to the one or more processors and storing instructions, wherein the one or more processors execute the instructions to: receive sidelink control information (SCI) from a second UE; receive data related to the SCI, from the second UE; through a physical sidelink shared channel (PSSCH); determine a physical sidelink feedback channel (PSFCH) resource for transmitting sidelink hybrid automatic repeat request (HARQ) feedback information related to the data to the second UE, based on an index of a slot and an index of a subchannel related to the PSSCH; start a first timer related to the PSFCH resource, based on the sidelink HARQ feedback information not being transmitted to the second UE through the PSFCH resource; start a second tinier related to a sidelink HARQ retransmission packet for the SCI or the PSSCH, based on the first timer being expired; and receive the sidelink HARQ retransmission packet from the second UE, after the second timer is started, wherein the sidelink HARQ feedback information may be not transmitted to the second OF through the PSFCH resource, based on a first priority related to the sidelink HARQ feedback information.

In one example, the first UE of the embodiment may refer to the first device described in the present disclosure. In one example, the at least one processor, the at least one memory, and the like in the device for controlling the first UE may be implemented as a separate sub-chip respectively, or at least two or more components may be implemented through one sub-chip.

According, to an embodiment of the present disclosure, a non-transitory computer-readable storage medium storing instructions may be proposed. The instructions, when executed, may cause a first device to: receive sidelink control information (SCI) from a second device; receive data related to the SCI, from the second device, through a physical sidelink shared channel (PSSCH); determine a physical sidelink feedback channel (PSFCH) resource for transmitting sidelink hybrid automatic repeat request (HARQ) feedback information related to the data to the second device, based on an index of a slot and an index of a subchannel related to the PSSCH; start a first timer related to the PSFCH resource, based on the sidelink HARQ feedback information not being transmitted to the second device through the PSFCH resource; start a second timer related to a sidelink HARQ retransmission packet for the SCI or the PSSCH, based on the first timer being expired; and receive the sidelink HARQ retransmission packet from the second device, after the second timer is started, wherein the sidelink HARQ feedback information may be not transmitted to the second device through the PSFCH resource, based on a first priority related to the sidelink HARQ feedback information.

Figure 14:
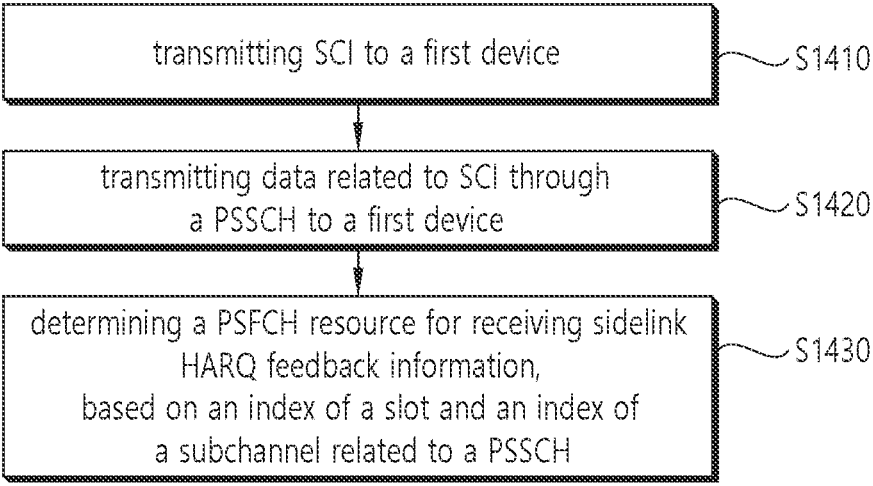
FIG. 14 is a flowchart showing a method for a second device to perform sidelink communication according to an embodiment of the present disclosure.

FIG. 14 is a flowchart showing a method for a second device to perform sidelink communication according to an embodiment of the present disclosure.

Operations disclosed in the flowchart of FIG. 14 may be performed in combination with various embodiments of the present disclosure. In one example, the operations disclosed in the flowchart of FIG. 14 may be performed based on at least one of the devices illustrated in FIGS. 15 to 20. In one example, the second device of FIG. 14 may correspond to the second wireless device 200 of FIG. 16 to be described later, and the first device may correspond to the first wireless device 100 of FIG. 16. In another example, the second device of FIG. 14 may correspond to the first wireless device 100 of FIG. 16 to be described later, and the first device may correspond to the second wireless device 200 of FIG. 16.

In step S1410, a second device according to an embodiment may transmit SCI to a first device.

In step S1420, a second device according to an embodiment may transmit, to a first device, data related to SCI through a PSSCH.

In step S1430, a second device according to an embodiment may determine a PSFCH resource for receiving sidelink HARQ feedback information based on an index of a slot and an index of a subchannel related to the PSSCH.

A first device according to an embodiment may start a first timer related to the PSFCH resource, based on the sidelink HARQ feedback information not being transmitted to the second device through the PSFCH resource.

A first device according to an embodiment may start a second timer related to a sidelink HARQ retransmission packet for the SCI or the PSFCH, based on the first timer being expired.

A first device according to an embodiment may receive the sidelink HARQ retransmission packet from the second device, after the second timer is started.

In an embodiment, the sidelink HARQ feedback information may be not transmitted to the second device through the PSFCH resource, based on a first priority related to the sidelink HARQ feedback information.

In an embodiment, the sidelink HARQ feedback information may be not transmitted to the second device, based on the first priority being lower than a second priority related to an uplink transmission to a base station.

In an example, the first device may give priority to UL when the priority value of UL data is less than a UL threshold, by comparing a priority value of UL data for uplink transmission to the base station with a UL threshold value for prioritization. In other words, it may be determined that the second priority is higher than the first priority. In this case, SL transmission for transmitting the sidelink HARQ feedback information may be dropped and UL transmission may be performed.

In another example, by comparing the priority value of the UL data with the UL threshold, if the priority value of the UL data is greater than the UL threshold, the first device may compare the priority of the SL data and the SL threshold for prioritization, By comparing the priority of the SL data regarding the transmission of the sidelink HARQ feedback information and the SL threshold, if the priority value of the SL data is less than the SL threshold, the first device may give priority to SL. In other words, it may be determined that the first priority is higher than the second priority. In this case, the UL transmission may be dropped and SL transmission may be performed. Conversely, if the priority value of the SL data is greater than the SL threshold, priority may be given to the UL (In other words, it may be determined that the second priority is higher than the first priority).

In an embodiment, the first timer may be started at a symbol or a slot following the end time of the PSFCH resource.

The first device according to an embodiment may start the first timer based on the sidelink HARQ feedback information being transmitted to the second device through the PSFCH resource.

In an embodiment, the first finer may be started at a symbol or slot subsequent to the end time of PSFCH transmission based on the sidelink HARQ feedback information.

In an embodiment, the first timer and the second timer may be maintained per sidelink HARQ process of the first device.

In an embodiment, the sidelink HARQ feedback information may not be transmitted to the second device, based on the first priority being lower than a third priority related to a sidelink transmission to a third device or a sidelink reception from the third device.

In an embodiment, sidelink communication based on a first wireless radio access technology (RAT) may be performed between the first device and the second device, sidelink communication based on a second wireless RAT may be performed between the first device and the third device.

In an embodiment, at least one of the first wireless RAT or the second wireless RAT may be new radio (NR) or long-term evolution (LTE).

In an embodiment, monitoring for receiving the sidelink HARQ retransmission packet from the second device may not be performed in a time interval in which the first timer operates.

In an embodiment, monitoring for receiving the sidelink HARQ retransmission packet from the second device may be performed in a time interval in which the second timer operates.

In an embodiment; the first device may be in a discontinuous reception (DRX) active state capable of receiving a signal from the second device, in the time interval in which the second timer operates:

In an embodiment, the second timer may be stated by the first device, based on the data being received through a HARQ disabled transmission of the second device.

According to an embodiment of the present disclosure, a second device for performing sidelink communication may be proposed. The second device may comprise: one or more memories storing instructions; one or more transceivers; and one or more processors connected to the one or more memories and the one or more transceivers, wherein the one or more processors may execute the instructions to: transmit SCI to the first device; transmit data related to SCI to through a PSSCH to the first device; determine a PSFCH resource for receiving sidelink HARQ feedback information, based on an index of a slot and an index of a subchannel related to PSSCH.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
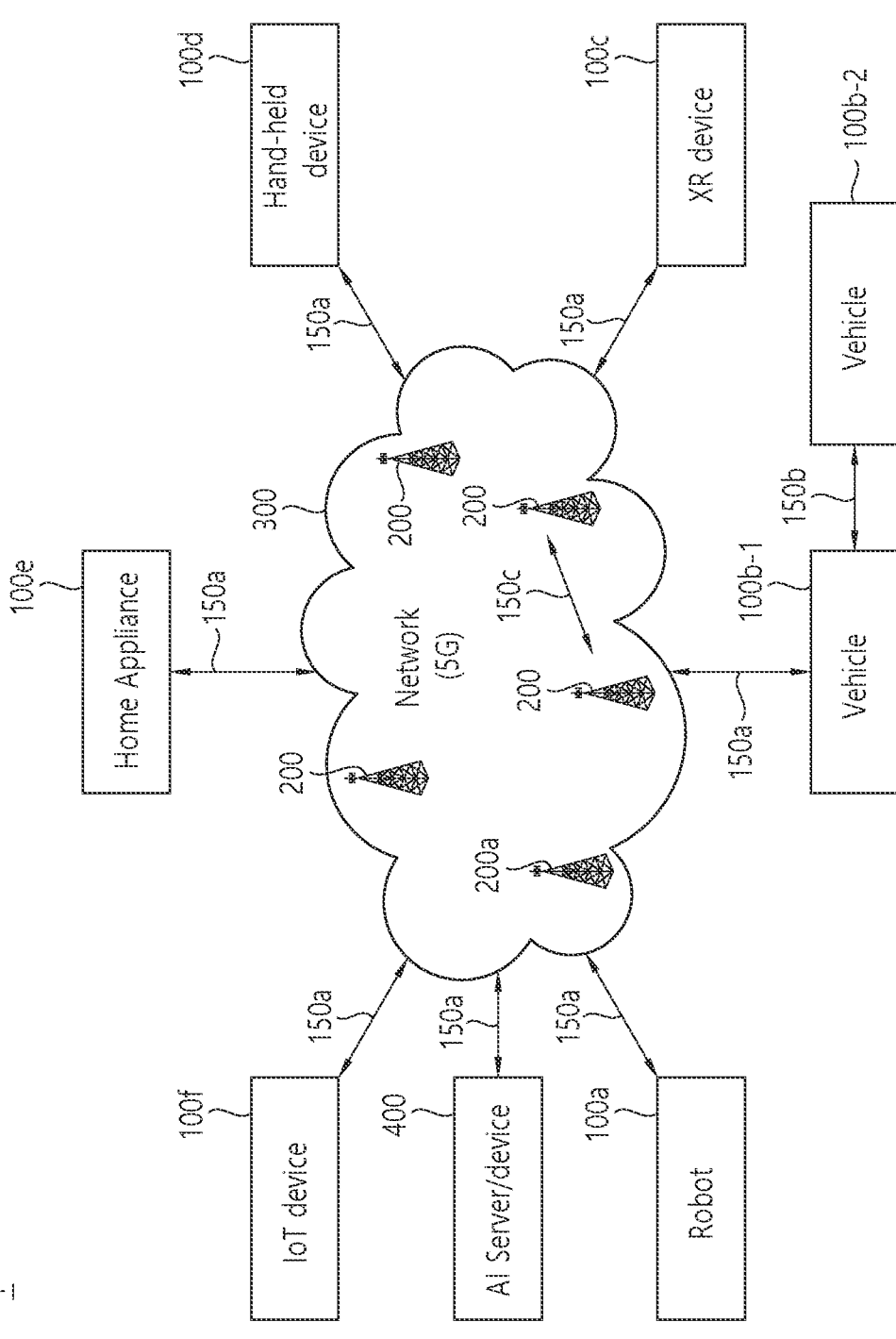
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices. Base Stations (BSs), and a network. Herein, the wireless devices represent devices performing communication using Radio Access Technology (RAT) (e.g., 5G New RAT (NR)) or Long-Term Evolution (LIE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LIE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LIFE Cat M2, 4) LIE non-Bandwidth Limited (non-BL), 5) LIE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated. Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. Tb this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
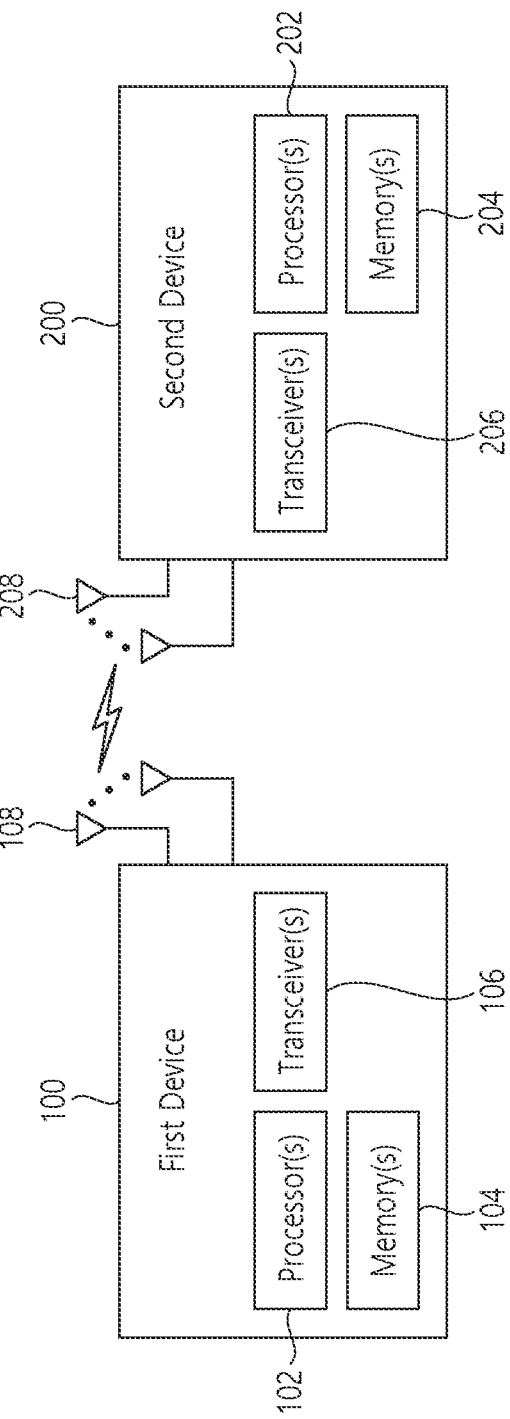
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATS (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceivers) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/'chip designed to implement RAT (e.g., LYE or NR). The transceiver(s) 206 may be connected to the processors) 202 and transmit and/or receive radio signals through one or more antennas 208. Each of the transceivers) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data. Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and; or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206, The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMS), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters, FIG. 17 shows a signal process circuit for a transmission signal, in accordance with an embodiment of the present disclosure.

Figure 17:
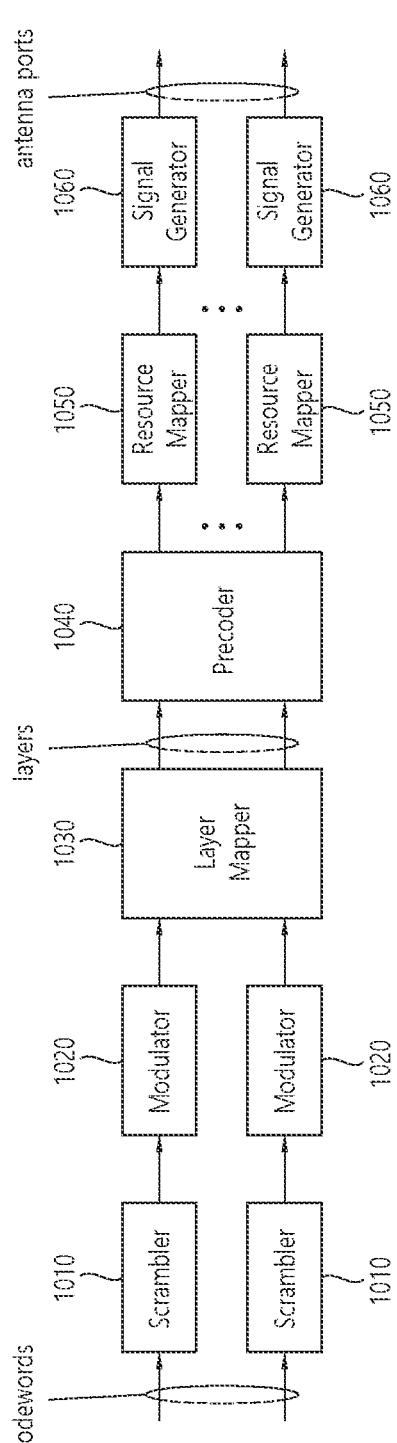
FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and in-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g, DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcodes, demodulators, descramblers, and decoders.

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 1.5), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
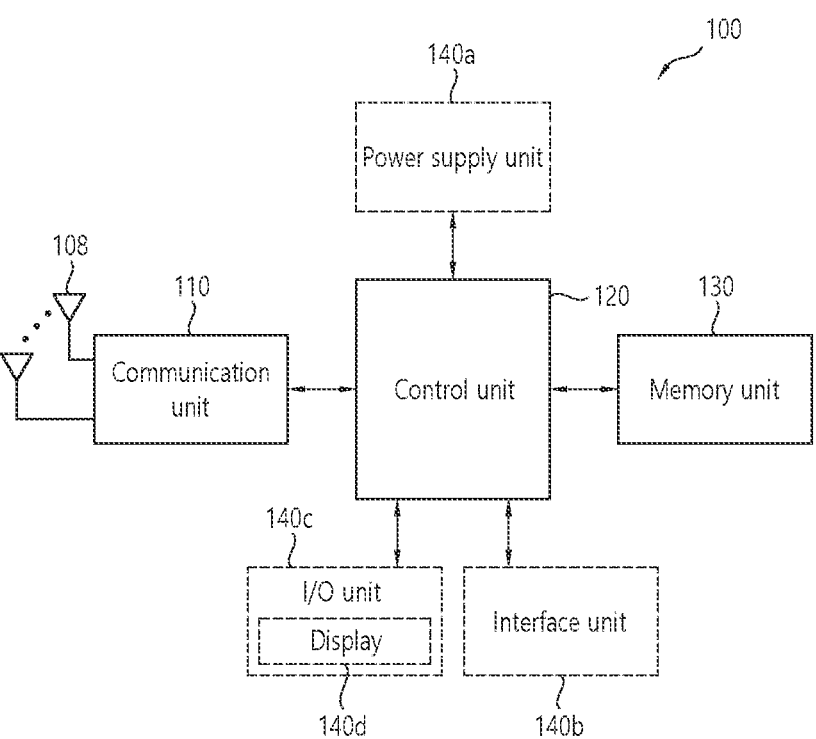
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140h, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100, The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140h may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
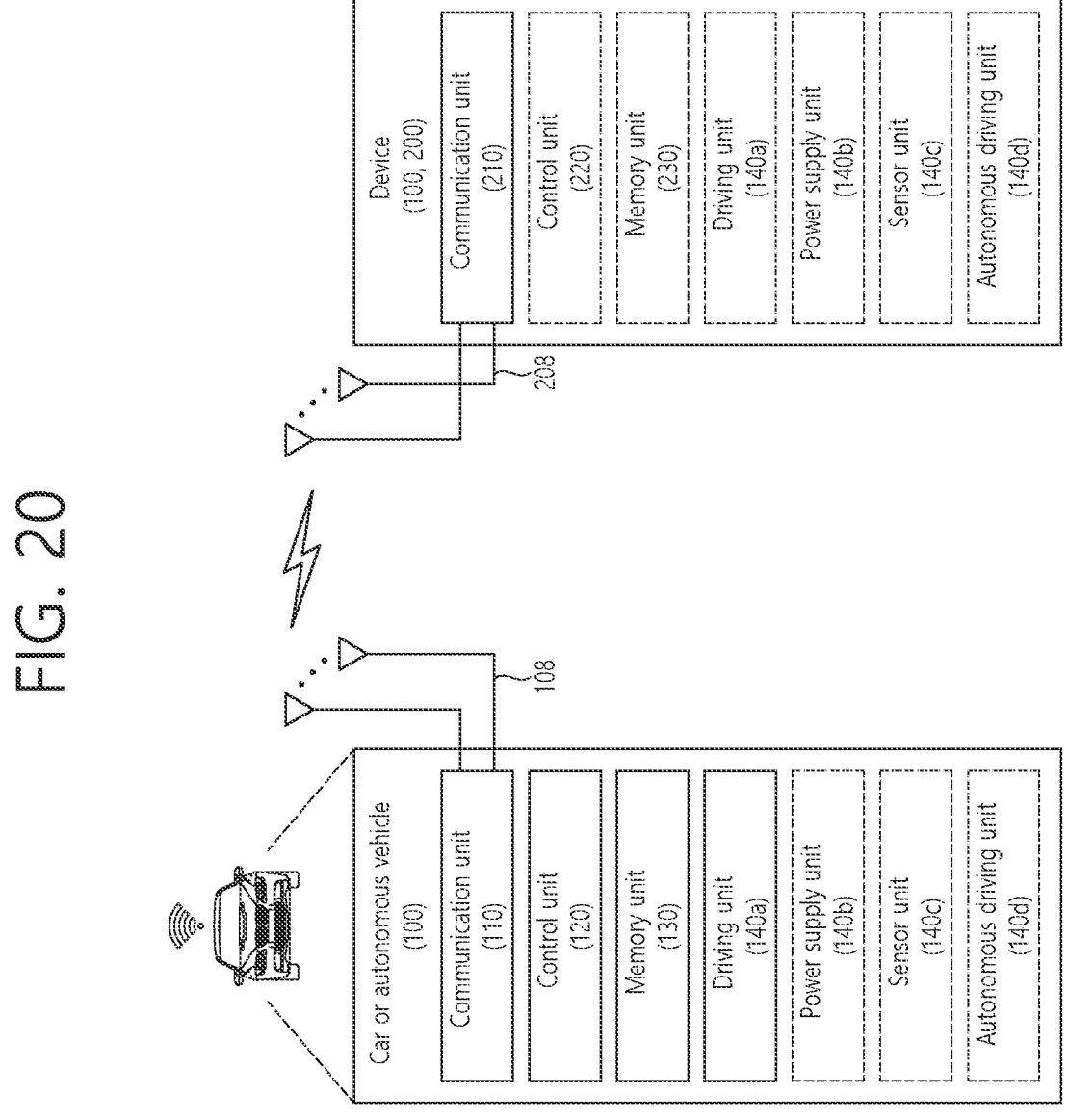
FIG. 20 shows a vehicle or an autonomous vehicle, in accordance with an embodiment of the present disclosure.

FIG. 20 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d, The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claims) and apparatus claim(s) can be combined to be implemented or performed in an apparatus. Further, technical features in method claim(s) and apparatus claim(s) can be combined to be implemented or performed in a method.

What is claimed is:

1. A method comprising:
receiving, from a second device, first sidelink control information (SCI) for scheduling of a physical sidelink shared channel (PSSCH) through a physical sidelink control channel (PSCCH);
receiving, from the second device, sidelink data and second SCI including sidelink transmission information associated with a sidelink process through the PSSCH;
determining a physical sidelink feedback channel (PSFCH) resource for transmitting sidelink hybrid automatic repeat request (HARQ) feedback information related to the reception through the PSSCH, based on a slot index related to the PSSCH and an index of a subchannel;
starting a sidelink (SL) discontinuous reception (DRX) HARQ round trip time (RTT) timer related to the sidelink process, based on the sidelink HARQ feedback information being not transmitted through the PSFCH resource due to prioritization between the sidelink communication and an uplink transmission;
starting an SL DRX retransmission timer for a sidelink retransmission related to the sidelink process, based on expiry of the SL DRX HARQ RTT timer; and
receiving the sidelink retransmission from the second device based on the SL DRX retransmission timer being running.

2. The method of claim 1, wherein the sidelink HARQ feedback information is not transmitted based on a first priority related to the sidelink HARQ feedback information being lower than a second priority related to an uplink transmission to a base station, in the prioritization.

3. The method of claim 1, wherein the SL DRX HARQ RTT timer is started at a symbol or a slot following an end time of the PSFCH resource.

4. The method of claim 1, further comprising:
starting the SL DRX HARQ RTT timer, based on the sidelink HARQ feedback information is transmitted to the second device through the PSFCH resource.

5. The method of claim 4, wherein the SL DRX HARQ RTT timer is started at a symbol or a slot following an end time of PSFCH transmission based on the sidelink HARQ feedback information.

6. The method of claim 1, wherein the SL DRX HARQ RTT timer and the SL DRX retransmission timer are maintained per sidelink HARQ process of a first device.

7. The method of claim 1, wherein the sidelink HARQ feedback information is not transmitted to the second device, based on a first priority being lower than a third priority related to a sidelink transmission to a third device or a sidelink reception from the third device.

8. The method of claim 7, wherein sidelink communication based on a first wireless radio access technology (RAT) is performed between a first device and the second device, and sidelink communication based on a second wireless RAT is performed between the first device and the third device.

9. The method of claim 1, wherein, due to prioritization between sidelink communication and uplink communication, the sidelink HARQ feedback information is not transmitted.

10. The method of claim 1, wherein monitoring for receiving the sidelink retransmission from the second device is not performed in a time interval during which the SL DRX HARQ RTT timer operates.

11. The method of claim 10, wherein monitoring for receiving the sidelink retransmission from the second device is performed in a time interval in which the SL DRX retransmission timer operates.

12. The method of claim 11, wherein a first device is in a discontinuous reception (DRX) active state capable of receiving a signal from the second device, in the time interval in which the SL DRX retransmission timer operates.

13. The method of claim 1, wherein the SL DRX retransmission timer is started based on the sidelink data being received through a HARQ disabled transmission of the second device.

14. A first device comprising:

one or more processors;

one or more transceivers; and one or more memories connected to the one or more processors and storing instructions, wherein the instructions, based on being executed by the one or more processors, cause the first device to:

receive, from a second device, first sidelink control information (SCI) for scheduling of a physical sidelink shared channel (PSSCH) through a physical sidelink control channel (PSCCH);

receive, from the second device, sidelink data and second SCI including sidelink transmission information associated with a sidelink process through the PSSCH;

determine a physical sidelink feedback channel (PSFCH) resource for transmitting sidelink hybrid automatic repeat request (HARQ) feedback information related to the reception through the PSSCH, based on a slot index related to the PSSCH and an index of a subchannel;

start a sidelink (SL) discontinuous reception (DRX) HARQ round trip time (RTT) timer related to the sidelink process, based on the sidelink HARQ feedback information being not transmitted through the PSFCH resource due to prioritization between the sidelink communication and an uplink transmission;

start an SL DRX retransmission timer for a sidelink retransmission related to the sidelink process, based on expiry of the SL DRX HARQ RTT timer; and receive the sidelink retransmission from the second device based on the SL DRX retransmission timer being running.

15. A processing device adapted to control a first device, the processing device comprising:

one or more processors; and one or more memories connected to the one or more processors and storing instructions, wherein the instructions, based on being executed by the one or more processors, cause the first device to:

receive, from a second device, first sidelink control information (SCI) for scheduling of a physical sidelink shared channel (PSSCH) through a physical sidelink control channel (PSCCH);

receive, from the second device, sidelink data and second SCI including sidelink transmission information associated with a sidelink process through the PSSCH;

determine a physical sidelink feedback channel (PSFCH) resource for transmitting sidelink hybrid automatic repeat request (HARQ) feedback information related to the reception through the PSSCH, based on a slot index related to the PSSCH and an index of a subchannel;

start a sidelink (SL) discontinuous reception (DRX) HARQ round trip time (RTT) timer related to the sidelink process, based on the sidelink HARQ feedback information being not transmitted through the PSFCH resource due to prioritization between the sidelink communication and an uplink transmission;

start an SL DRX retransmission timer for a sidelink retransmission related to the sidelink process, based on expiry of the SL DRX HARQ RTT timer; and receive the sidelink retransmission from the second device based on the SL DRX retransmission timer being running.

* * * * *